United States Patent

Yamato et al.

Patent Number: 6,094,431
Date of Patent: Jul. 25, 2000

[54] NODE DEVICE AND NETWORK RESOURCE RESERVATION METHOD FOR DATA PACKET TRANSFER USING ATM NETWORKS

[75] Inventors: Katsumi Yamato, Saitama; Yasuhiro Katsube, Kanagawa, both of Japan

[73] Assignee: Kabushiki Kaisha Toshiba, Kawasaki, Japan

[21] Appl. No.: 08/758,480

[22] Filed: Nov. 29, 1996

[30] Foreign Application Priority Data

Nov. 30, 1995 [JP] Japan ................................. 7-312589
Feb. 2, 1996 [JP] Japan ................................. 8-017449
Feb. 29, 1996 [JP] Japan ................................. 8-043545

[51] Int. Cl.$^7$ ........................... H04L 12/28; H04L 12/56; H04J 3/16
[52] U.S. Cl. ..................... 370/395; 370/468; 370/401; 370/409; 370/465
[58] Field of Search ..................... 370/395, 400, 370/389, 466, 468, 401, 465, 397, 409, 410, 467, 229, 231

[56] References Cited

U.S. PATENT DOCUMENTS

| 5,258,979 | 11/1993 | Oomuro et al. | 370/95.1 |
| 5,416,771 | 5/1995 | Iwata | 370/60 |
| 5,579,312 | 11/1996 | Regache | 370/60.1 |
| 5,732,080 | 3/1998 | Ferguson et al. | 370/392 |

OTHER PUBLICATIONS

Zhang et al., "RSVP: A New Resource Reservation Protocol", IEEE Network, pp. 8–18, Sep. 1993.
"Traffic Control and Congestion Control in B–ISDN", ITU–T Recommendation I.371, Section 2.5.5, pp. 27/63–33/63, Jul. 1995.
"Broadband Integrated Services Digital Networks (B–ISDN) Digital Subscriber Signalling System No. 2 (DSS 2), Connection Modification", ITU–T Recommendation Q.2963, pp. 1–23, May 1995.

*Primary Examiner*—Alpus H. Hsu
*Assistant Examiner*—Duc Ho
*Attorney, Agent, or Firm*—Foley & Lardner

[57] ABSTRACT

A network resource reservation scheme capable of making a resource reservation at the IP level according to the resource reservation protocol at a time of data packet transfer at the IP level using ATM networks. A node device requests a change of a virtual connection for transferring data packets to a prescribed virtual connection for providing a service which is capable of changing an amount of resource without reestablishing connections, when a prescribed message of a resource reservation protocol for that virtual connection is received, and transmits the data packets to the prescribed virtual connection established in response to the request. A node device determines a necessary amount of resource according to a requested quality of service described in a received reservation message of a resource reservation protocol. A node device then requests a change of an amount of resource reserved in a virtual connection for transferring data packets in order to reserve the necessary amount of resource in that virtual connection, and transmits the data packets to that virtual connection in which the amount of resource reserved therein is changed in response to the request.

41 Claims, 18 Drawing Sheets

NODE DEVICE AND NETWORK RESOURCE RESERVATION METHOD FOR DATA PACKET TRANSFER USING ATM NETWORKS

BACKGROUND OF THE INVENTION

1. Field of the Invention

The present invention relates to a node device and a network resource reservation method for transfer of data packets such as IP (Internet Protocol) datagrams using ATM (Asynchronous Transfer Mode) networks.

2. Description of the Background Art

In a case of carrying out the communication using the Internet, data transmitted by a sender is converted into a data packet called IP datagram which is defined at an IP (Internet Protocol) level, and the converted data packet is delivered to a receiver.

The conventional data packet delivery service defined by the IP is a Best-Effort system, that is, a delivery system which does not provide any guarantee regarding the data packet delivery (so that the data packet may be lost but no measure against a packet loss is provided) but which makes the best effort to attempt the data packet delivery. In other words, conventionally, no quality has been guaranteed for the delivery of the data packet at the IP level.

In this regard, in recent years, there is a discussion in the IETF (Internet Engineering Task Force) regarding the quality to be provided for the delivery of the data packet at the IP level. For example, there are propositions of new services which specify various qualities for the data packet delivery, such as Guaranteed Quality of Service, Predictive Quality of Service, and Controlled Delay Quality of Service.

These new services can be briefly described as follows.

(1) Guaranteed Quality of Service

This is a service which guarantees that the data packet delivery is carried out within a prescribed period of time for sure. For the quality of service, the transmission rate value is to be requested.

(2) Predictive Quality of Service

This is a service which guarantees that the data packet delivery is carried out within a prescribed period of time at high probability (that is, this is a service which guarantees to deliver most data packets to their destinations within a prescribed period of time). For the service quality, the service level (1, 2, 3) is to be requested, where the relative delay is less for the smaller service level value. In addition, an upper limit for a required transfer time with respect to each service level is set up at each communication node.

(3) Controlled Delay Quality of Service

This is a service in which the service level is to be requested as the quality of service but an upper limit for a required transfer time is not set up. In this service, the data packet delivery delay changes dynamically, but the data packet delivery can be made in a shorter time than the conventional Best-Effort service.

(4) Best-Effort Service

This is a service which does not guarantee any quality, so that no quality of service is to be requested.

On the other hand, there is also a proposition of a resource reservation protocol called RSVP (Resource ReSerVation Protocol) which becomes necessary in order to provide the above described services.

This RSVP is characterized in that the resource reservation is carried out according to a request from a destination user terminal. The destination user terminal transmits a reservation message called Resv message to a source user terminal so as to attempt the reservation of the receiving quality of service which is described within the Resv message. Then, when the Resv message is received by a data packet communication node (router device) which relays the data packet sent from the source user terminal to the destination user terminal, whether it is possible to accept the resource reservation required in providing the receiving quality of service indicated by this Resv message or not is judged, and if it is judged possible, the reservation request is accepted and this Resv message is transmitted to the source user terminal.

In a case of carrying out the data packet transfer at the IP level using virtual connections established on ATM networks, in which data are switched and transferred in units of fixed length data packets called cells, there has been no need for the guarantee of the quality of service for the data packet transfer at the IP level and the reservation of the network resource conventionally, so that the quality at the IP level has not been taken into consideration at a time of the data packet delivery. Conventionally, only a scheme for accommodating data packets to virtual connections has been discussed, and a scheme for establishing virtual connections in consideration to the above described provision to provide a requested quality of service at the packet level has not been discussed.

In addition, in a case of carrying out the data packet transfer using ATM networks, when a message requesting a change of the quality of service (such as an Resv message transmitted from a destination user terminal to a source user terminal in the RSVP, for example) is received, there is a need to change attributes (a service category, an amount of resources to be reserved, etc.) of virtual connections which accommodate data packets corresponding to that message, and in conjunction with this change of attributes, there are cases in which it is necessary to newly establish virtual connections in order to be able to provide the newly requested quality of service. In such cases, the data packet transfer cannot be carried out until the virtual connections are newly established, so that the undesirable increase of the packet transfer delay can be caused.

SUMMARY OF THE INVENTION

It is therefore an object of the present invention to provide a node device and a network resource reservation method capable of making a resource reservation at the IP level according to the resource reservation protocol (RSVP) at a time of data packet transfer at the IP level using ATM networks.

It is another object of the present invention to provide a node device and a network resource reservation method capable of providing a requested quality of service at the IP level at a time of data packet transfer at the IP level using ATM networks, in which the data packet transfer can be started immediately even when the requested quality of service is changed.

According to one aspect of the present invention there is provided a node device, comprising: transfer means for receiving cells defining data packets and messages, converting a received data packet into ATM cells, and transmitting converted ATM cells to virtual connections; and request means for requesting a change of a virtual connection for transferring data packets from one virtual connection to a prescribed virtual connection for providing a service which is capable of changing an amount of resource without reestablishing connections (that is, without changng the VCI), when a prescribed message of a resource reservation protocol for said virtual connection is received by the transfer means.

According to another aspect of the present invention there is provided a node device, comprising: transfer means for receiving cells defining data packets and messages, converting a received data packet into ATM cells, and transmitting converted ATM cells; determining means for determining a necessary amount of resource according to a requested quality of service described in a reservation message, when the reservation message of a resource reservation protocol sent from a data packet destination user terminal to a data packet source user terminal is received by the transfer means; and request means for requesting a change of an amount of resource reserved in a virtual connection for transferring data packets in order to reserve the necessary amount of resource determined by the determining means in said virtual connection. Note that the request means may request a change of an amount of resource from zero to a finite amount in this case.

According to another aspect of the present invention there is provided a network resource reservation method in a node device for receiving cells defining data packets and messages, converting a received data packet into ATM cells, and transmitting converted ATM cells to virtual connections, the method comprising the steps of: requesting a change of a virtual connection for transferring data packets from one virtual connection to a prescribed virtual connection for providing a service which is capable of changing an amount of resource without reestablishing connections (that is, without changing the VCI), when a prescribed message of a resource reservation protocol for said virtual connection is received by the node device; and transmitting the data packets to the prescribed virtual connection established in response to the requesting step.

According to another aspect of the present invention there is provided a network resource reservation method in a node device for receiving cells defining data packets and messages, converting a received data packet into ATM cells, and transmitting converted ATM cells, the method comprising the steps of: determining a necessary amount of resource according to a requested quality of service described in a reservation message, when the reservation message of a resource reservation protocol sent from a data packet destination user terminal to a data packet source user terminal is received by the node device; requesting a change of an amount of resource reserved in a virtual connection for transferring data packets in order to reserve the necessary amount of resource determined by the determining step in said virtual connection; and transmitting the data packets to said virtual connection in which the amount of resource reserved therein is changed in response to the requesting step. Note that the requesting step may request a change of an amount of resource from zero to a finite amount in this case.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 15, the first embodiment of a node device and a network resource reservation method according to the present invention will be described in detail.

First, the basic configuration and outline of this first embodiment will be described.

Figure 1:
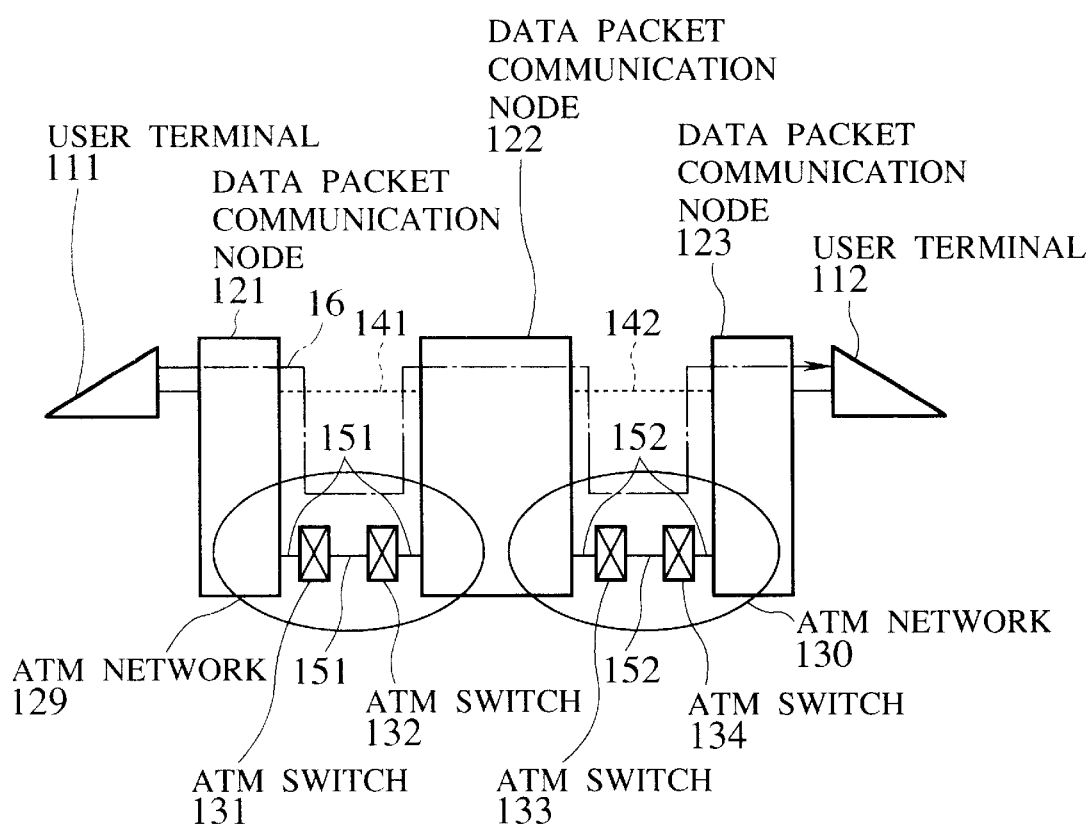
FIG. 1 is a block diagram of an exemplary basic configuration of a data packet communication network using node devices and a network resource reservation method according to the present invention.

FIG. 1 shown one exemplary basic configuration of a data packet communication network in this first embodiment. This data packet communication network of FIG. 1 includes data packet communication nodes 121 to 123 for transferring data packets, and when a data packet is to be transferred through these data packet communication nodes 121 to 123, the data packet is divided and converted into fixed length data units called cells, and the data packet transfer is realized by transferring the cells between adjacent communication nodes using virtual connections 151 and 152 which are established on ATM networks 129 and 130. Here, the virtual connections are connections to be established by ATM switches 131 to 134 between nodes of the ATM networks 129 and 130, which include virtual path connections and virtual channel connections.

At user terminals 111 and 112 which utilize this data packet communication network of FIG. 1, data to be transmitted are converted into data packets called IP datagrams which are defined at the IP level, and these IP datagrams are transmitted through this data packet communication network.

In the following, this data packet called IP datagram will be referred to as an IP packet. Moreover, in a case of explicitly indicating an IP packet with data as its content, a term IP data packet will be used.

It is also possible to consider a case in which the communication between the user terminals 111 and 112 is carried out according to a protocol at an upper level of the IP level (e.g. TCP). In such a case, it is possible to use a method for converting data into IP packets within the terminals 111 and 112 first and then transmitting the IP packets to the communication network, or a method for converting data packets arrived according to the upper level protocol into IP packets at the data packet communication nodes 121 and 123 which are closest to the terminals 111 and 112. In this first embodiment, the use of the former method will be assumed.

As for the connection between the user terminal 111 and the data packet communication node 121 and the connection between the user terminal 112 and the data packet communication node 123, it is possible to use any of (1) a direct connection, (2) a connection by an ATM network, and (3) a connection by the other network such as Ethernet. In this first embodiment, the use of (1) a direction connection will be assumed.

Also, in this first embodiment, in a case of carrying out the IP packet transfer between the user terminals, it will be assumed that the user terminal 111 is an IP packet source terminal and the user terminal 112 is an IP packet destination terminal.

Figure 2:
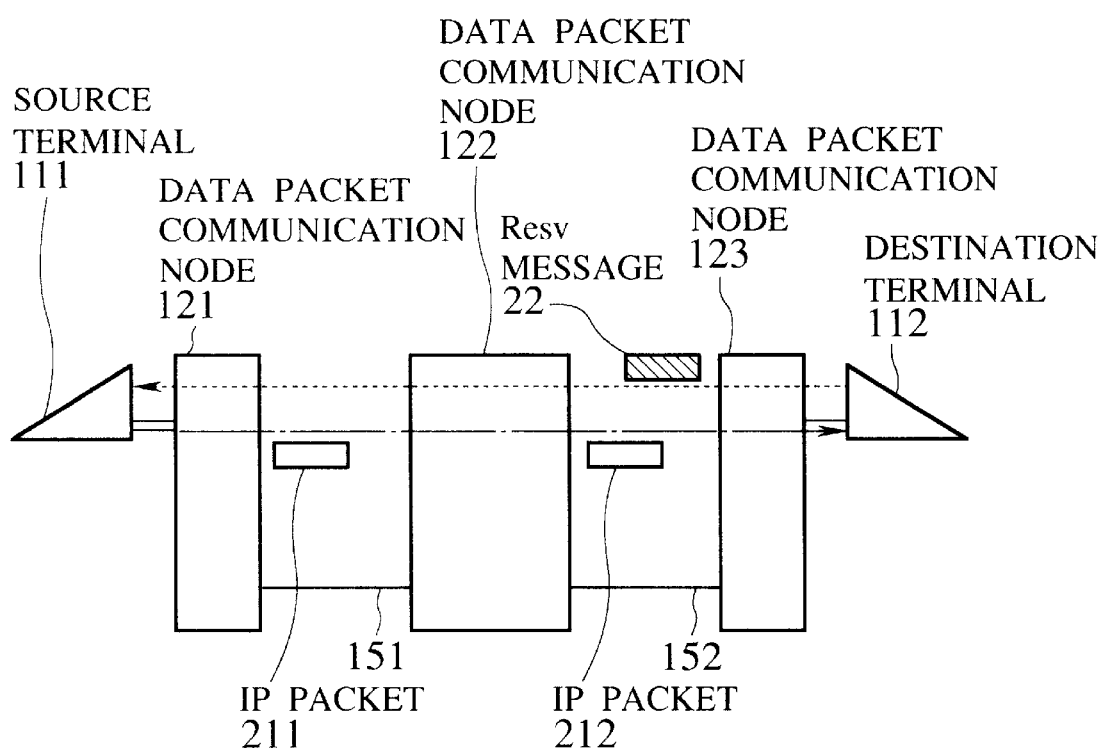
FIG. 2 is a block diagram of the data packet communication network according to the present invention, for explaining the resource reservation protocol used in the present invention.

In the data packet communication network of this first embodiment, the reservation of resources on the ATM networks in conjunction with the IP packet transfer is made according to the resource reservation protocol called RSVP as proposed in the IETF. In the RSVP, as indicated in FIG. 2, the destination terminal 112 requests to the data packet communication network the quality of service for the IP data packets 211 and 212 transmitted by the source terminal 111, and in response the data packet communication network makes the reservation of the network resources necessary for satisfying that request. To this end, the destination terminal 112 for requesting the quality of service transmits a reservation message called Resv message 22 to the source terminal 111 through a path in a direction opposite to that of a path for transferring the IP data packet, according to the need.

In the data packet communication node of this first embodiment, when the Resv message is received, an amount of resources to be reserved in order to provide the requested quality of service described in the Resv message is calculated, and whether it is possible to reserve the calculated amount of resources. If it is possible to reserve the calculated amount of resources, the calculated amount of resources are actually reserved, and the Resv message is transmitted toward the source terminal 111 again.

In the data packet communication network of this first embodiment, the IP packet transfer using the virtual connections 151 and 152 which are established among the data packet communication nodes 121 to 123 is carried out, so that reserving the amount of resources implies reserving the amount of resources (a utilization bandwidth) for the virtual connections.

Figure 3:
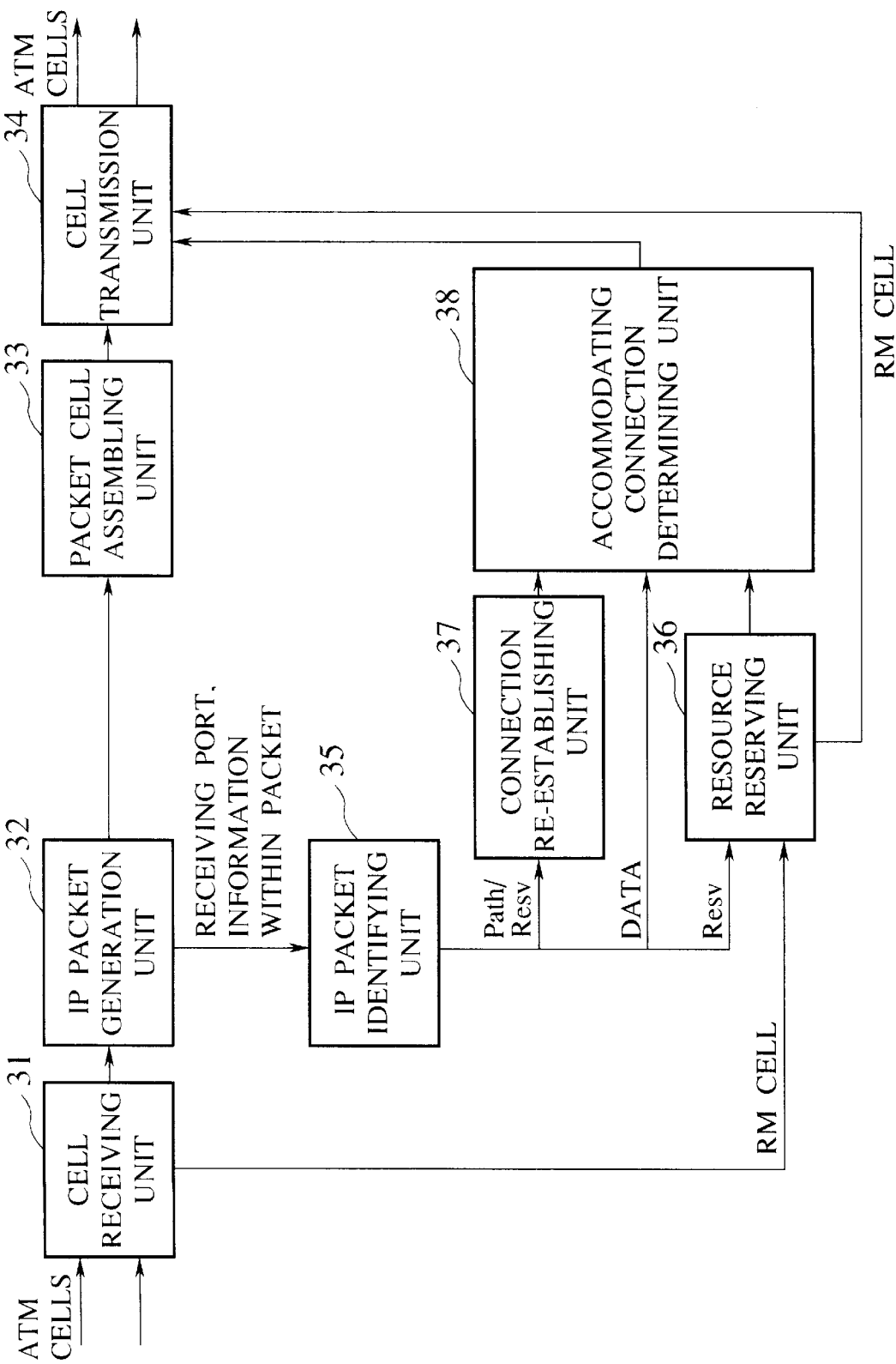
FIG. 3 is a block diagram of an exemplary configuration of a data packet communication node located between other data packet communication nodes in the data packet communication network of FIG. 1 according to the first embodiment of the present invention.
Figure 4:
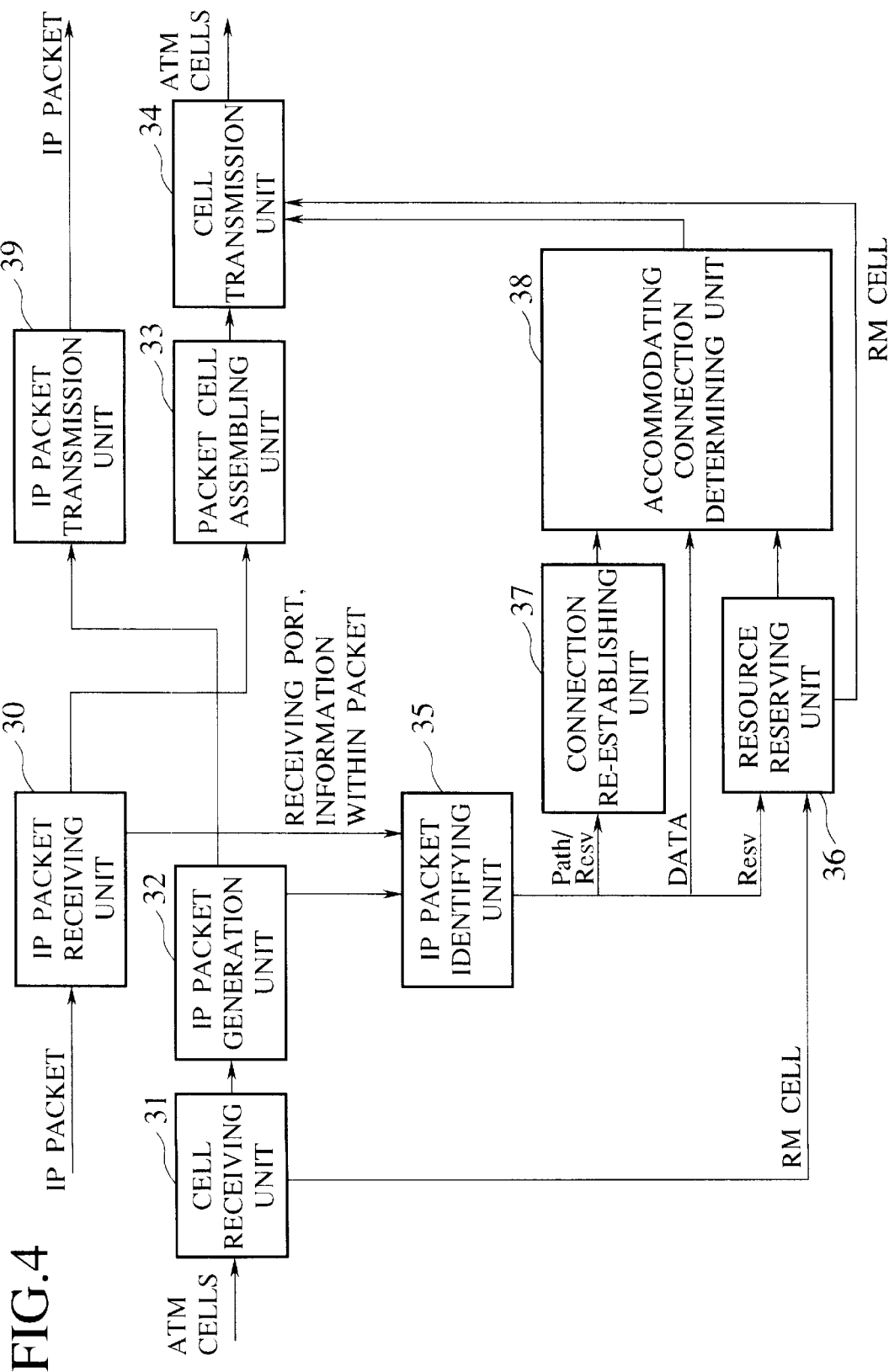
FIG. 4 is a block diagram of an exemplary configuration of a data packet communication node directly connected with a user terminal in the data packet communication network of FIG. 1 according to the first embodiment of the present invention.

In the data packet communication node provided in this data packet communication network, as indicated in FIG. 3 and FIG. 4, when the received IP packet is judged as the Resv message, a resource reserving unit 36 newly reserves or changes a utilization bandwidth for virtual connection which accommodates the IP data packet for which the resource reservation is requested by the Resv message.

Note that, in the configuration of FIG. 3 or FIG. 4, a resource reserving unit 36 functions as a unit for determining a necessary amount of resource according to a requested quality of service described in a reservation message, when the reservation message (Resv message) of a resource reservation protocol (RSVP) sent from a data packet destination user terminal to a data packet source user terminal is received, and as a unit for requesting a change of an amount of resource reserved in a virtual connection for transferring data packets in order to reserve the necessary amount of resource in the virtual connection, as will be described in detail below.

Also, a connection re-establishing unit 37 functions as a unit for requesting a change of a virtual connection for transferring data packets from one virtual connection to a prescribed virtual connection for providing a service which is capable of changing an amount of resource without reestablishing connections (that is, without changng the VCI), when a prescribed message (Resv message or Path message) of a resource reservation protocol (RSVP) for the virtual connection is received, as will be described in detail below.

In addition, a connection re-establishing unit 37 and an accommodating connection determining unit 38 together function as a unit for changing a maximum cell transfer rate of the prescribed virtual connection when a particular message (Path message) of the resource reservation protocol (RSVP) sent from a data packet source user terminal to a data packet destination user terminal is received, as will be described in detail below.

In this first embodiment, the virtual connections 151 and 152 to be established between the data packet communication nodes are assumed to be capable of providing a service called ABT (ATM Block Transfer) as recommended by the ITU-T Recommendation i.371, in order to realize the resource reservation in conjunction with the Resv message.

Figure 5:
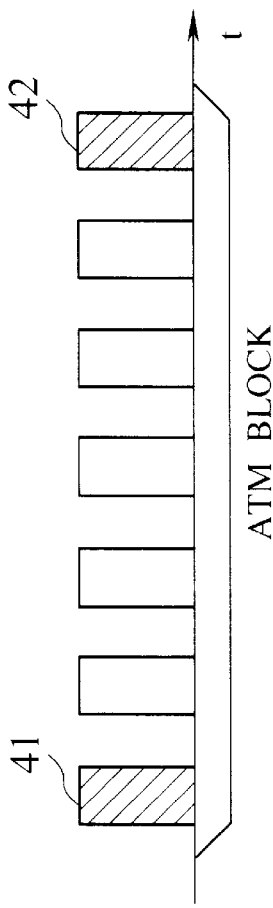
FIG. 5 is a diagram for explaining an ATM block of the ABT service used in the first embodiment of the present invention.

In the ABT, as indicated in FIG. 5, it is possible to dynamically change a transmission rate of cells belonging to an ATM block which is enclosed by adjacent RM (Resource Management) cells 41 and 42, without re-establishing the virtual connections (that is, without changing the VCI). In the ABT connection, only the maximum cell transmission rate that can be provided by that connection is determined in advance at a time of connection establishing, and at a time of actually transferring cells, the requested quality of service (cell transmission rate) is notified from the data packet communication node on an upstream side (or the data packet communication node on a downstream side) to the ATM network by using the RM cell 41 at the top of the ATM block, and the ATM network reserves an amount of bandwidth necessary for providing the requested quality of service for the connection until the RM cell 42 indicating the end of the ATM block is received.

Note that, in the IP data packet transfer route from the source terminal to the destination terminal, a side closer to the source terminal is referred to as an upstream side and a side closer to the destination terminal is referred to as a downstream side.

Figure 6:
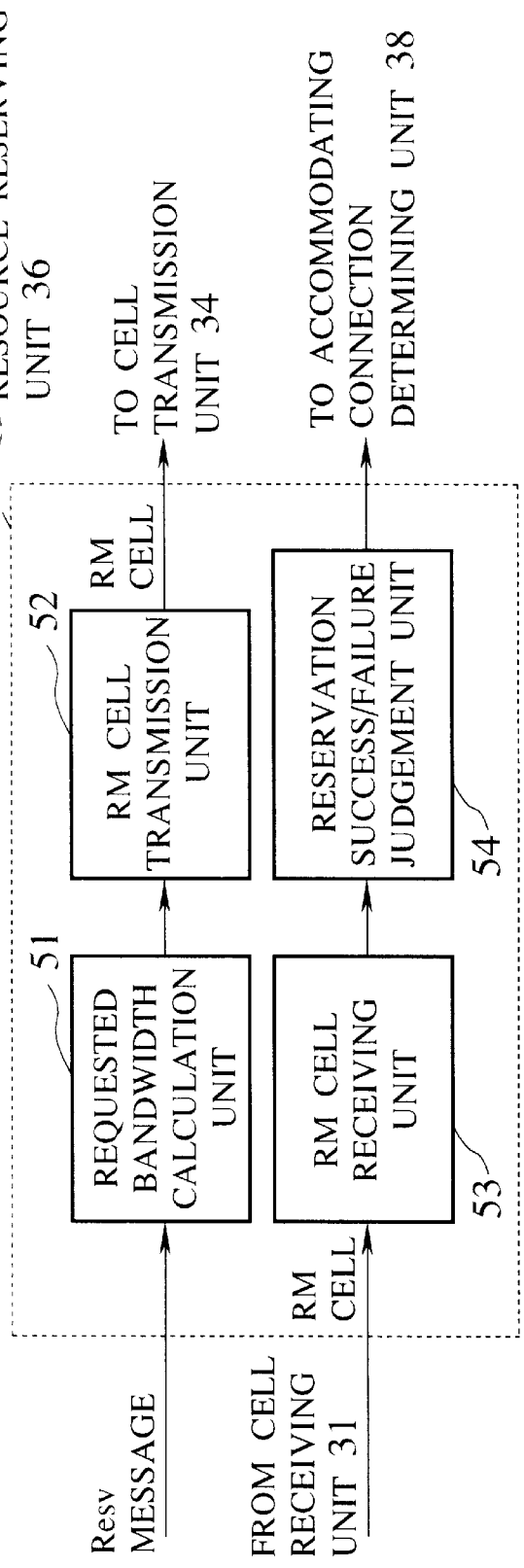
FIG. 6 is a block diagram of an exemplary internal configuration of the resource reserving unit in the data packet communication node of FIG. 3 or FIG. 4.

The resource reservation using the ABT connection is carried out at the resource reserving unit 36 with a configuration as shown in FIG. 6, for example. In this resource reserving unit 36 of FIG. 6, an amount of bandwidth (cell transmission rate) necessary for providing the requested quality of service described in the received Resv message is calculated at a requested bandwidth calculation unit 51, and the RM cell describing the calculated rate is transmitted to the ATM network at an RM cell transmission unit 52.

Then, when the RM cell indicating the judgement result by the ATM network regarding whether it is possible to reserve the requested amount of bandwidth for virtual connections or not is received at an RM cell receiving unit 53 of the resource reserving unit 36, whether the requested amount of bandwidth is reserved or not is judged according to an information in that RM cell at a reservation success/failure judgement unit 54. This judgement can be made by looking at a CI (Congestion Indication) bit in the received RM cell. Then, this judgement result is notified to an accommodating connection determining unit 38 of FIG. 3 and FIG. 4, and the received Resv message is transmitted toward the source terminal when the requested amount of bandwidth was reserved, whereas the received Resv message is not transmitted toward the source terminal when the requested amount of bandwidth was not reserved.

Here, the virtual connection with respect to which the change of the amount of bandwidth is carried out by this resource reserving unit 36 can be the virtual connection by which the data packet communication node including this resource reserving unit 36 carries out the cell transmission, or the virtual connection by which the data packet communication node including this resource reserving unit 36 carries out the cell reception. In a case of the data packet communication node 122 shown in FIG. 1, for example, the amount of bandwidth of the virtual connection 152 is changed in the former case, whereas the amount of bandwidth of the virtual connection 151 is changed in the latter case, at this data packet communication node 122.

Also, the data packet communication node in this first embodiment carries out the establishing of a virtual connection between adjacent node in conjunction with the IP data packet transmission start. At this point, the transmission of the Resv message from the destination terminal 112 with respect to the transfer of that IP data packet may not necessarily be carried out (as there are cases of not requesting the quality of service at all), so that the following three types of virtual connection establishing procedures (including a method according to the Resv message and a method not depending on the Resv message) will be considered.

(1) At the data packet communication node which received the IP data packet to be transferred, if the virtual connection for accommodating that IP data packet does not exist, that IP data packet is accommodated on a UBR (Unspecified Bit Rate) connection which does not guarantee any quality for the cell transfer. Then, when the Resv message sent from the destination terminal is received, the connection to accommodate that IP data packet is changed from the UBR connection to the ABT connection. At this point, for the maximum cell transmission rate at the ABT connection, either a value determined in advance within the data packet communication node is adopted, or when a Path message sent from the source terminal to the destination terminal is already received at that data packet communication node, the maximum cell transmission rate to be provided by the ABT connection is calculated in advance according to the traffic characteristic of the IP data packet described within the Path message, and the calculated value is adopted at a time of the ABT connection establishing. Else, it is also possible to adopt the maximum cell transmission rate value capable of providing the requested quality described within the Resv message.

(2) At the data packet communication node which received the IP data packet to be transferred, if the virtual connection for accommodating that IP data packet does not exist, that IP data packet is accommodated on the UBR connection first. Then, when the Path message sent from the source terminal is received, the connection to accommodate that IP data packet is changed from the UBR connection to the ABT connection. At this point, for the maximum cell transmission rate at the ABT connection, either a value determined in advance within the data packet communication node is adopted, or the maximum cell transmission rate to be provided by the ABT connection is calculated according to the traffic characteristic of the IP data packet described within the Path message.

(3) At the data packet communication node which received the IP data packet to be transferred, if the virtual connection for accommodating that IP data packet does not exist, that IP data packet is accommodated on the ABT connection with the maximum cell transmission rate equal to a value determined in advance within the data packet communication node first. Then, when the Path message sent from the source terminal is received, the connection to accommodate that IP data packet is changed to the ABT connection with the maximum cell transmission rate which is calculated according to the traffic characteristic of the IP data packet described within the Path message. At this point, for the maximum cell transmission rate of the ABT connection established at a time of the IP data packet transfer start (that is, the above described value determined in advance within the data packet communication node), it is possible to adopt the maximum cell transmission rate value of a physical transmission path which accommodates that connection.

In this first embodiment, the resource reservation in conjunction with the Resv message can also be realized in a case of using a virtual connection as recommended in the ITU-T Recommendation Q.2963 which has a function to change the connection characteristic according to the signaling message, apart from a case of using a virtual connection for providing the ABT service.

Figure 7:
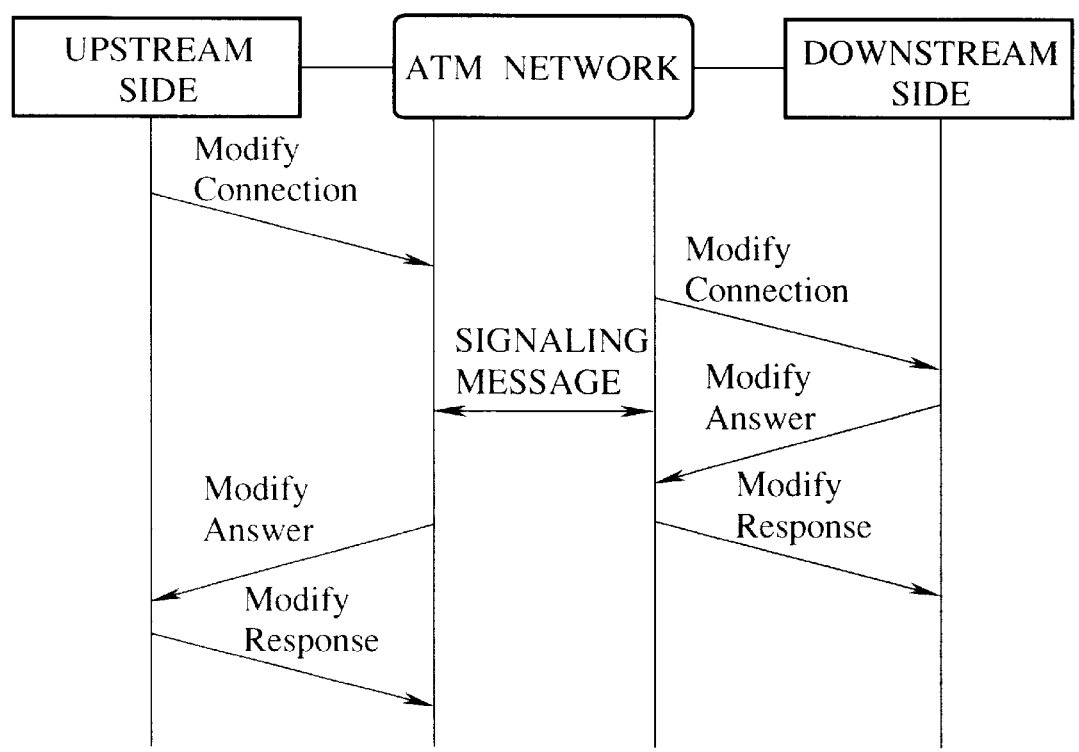
FIG. 7 is a sequence diagram for explaining a signaling message that can be used in the first embodiment of the present invention.

In this virtual connection according to the ITU-T Recommendation Q.2963, a change of the transmission rate without the re-establishing of the virtual connection (that is, without changing the VCI) is carried out according to the signaling message as indicated in FIG. 7. In FIG. 7, a user (an upstream side node) which requests the change of the connection characteristic transmits a Modify Connection message to the ATM network. When this message is accepted within the network, this message is further transmitted to a destination user (downstream side node). When this message is also accepted at the destination user, the destination user transmits a Modify Answer message which contains an answer (accept/reject) to the Modify Connection message to the ATM network, and this message is further transmitted from the ATM network to the user who requested the change. Each of the ATM network which received the Modify Answer message and the user who requested the change transmits a Modify Response message, and when the correction request within the Modify Connection message is accepted, the service according to the correction request is provided.

Figure 8:
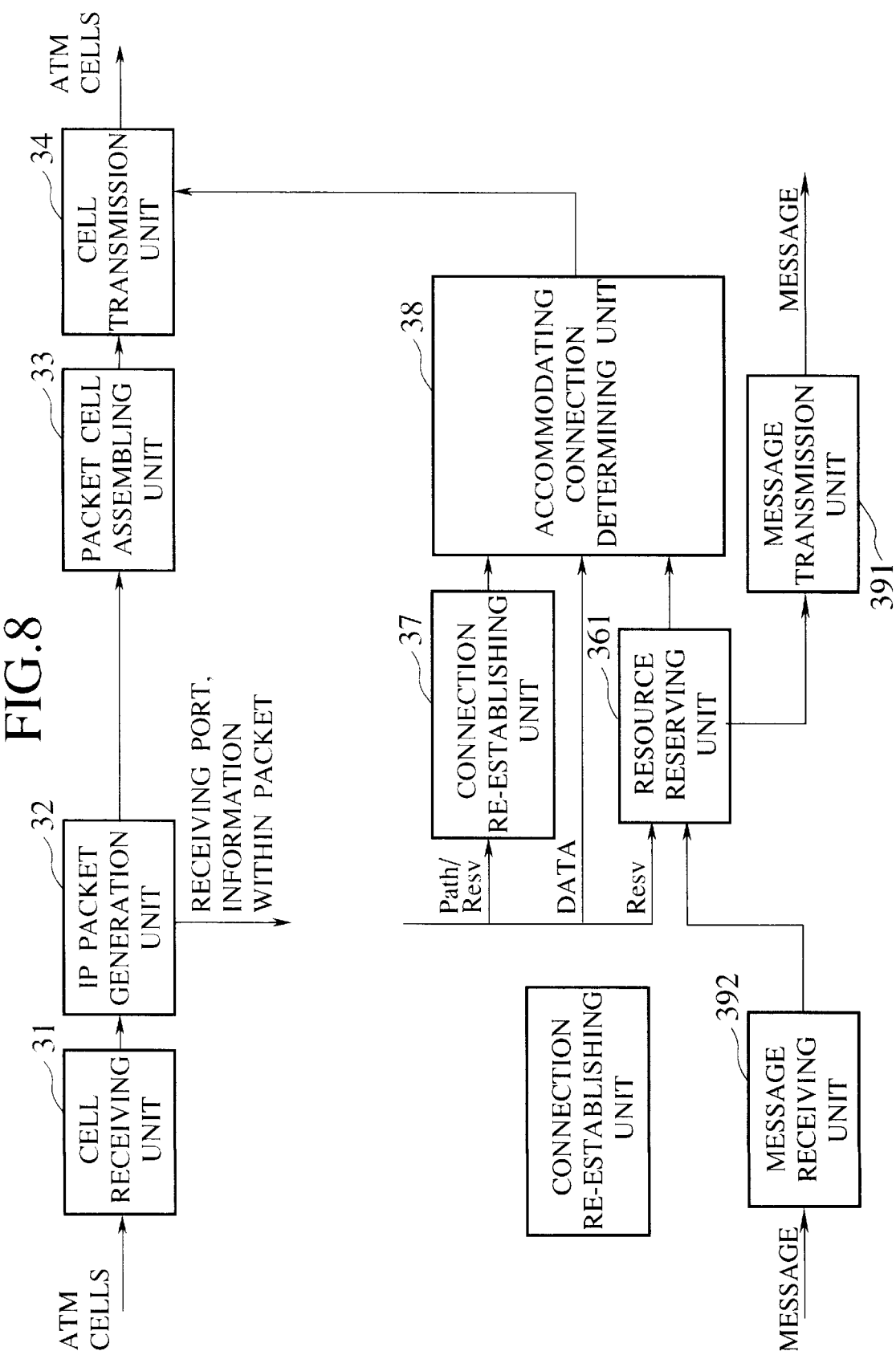
FIG. 8 is a block diagram of an exemplary configuration of a data packet communication node according to the first embodiment of the present invention, for a case of using the signaling message.
Figure 9:
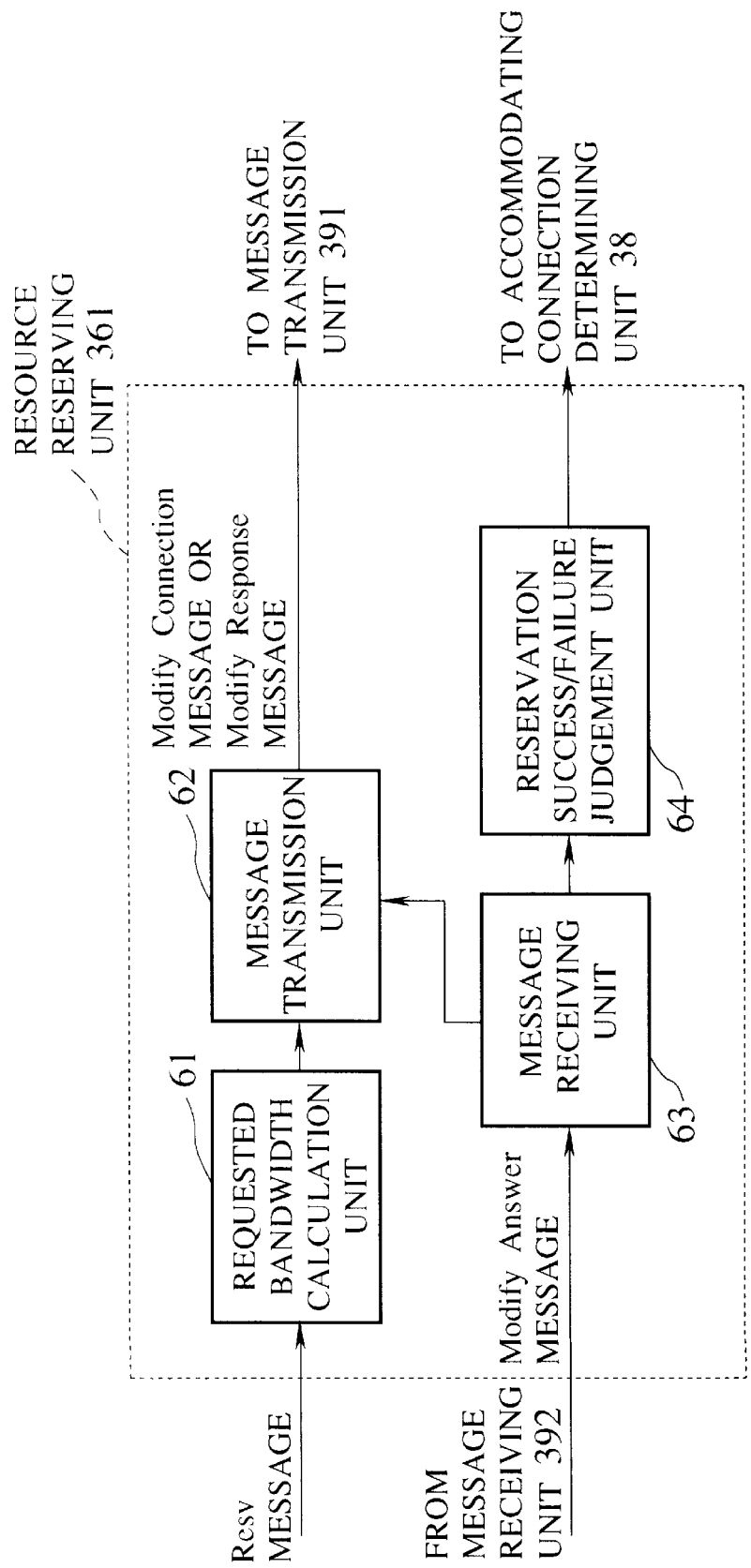
FIG. 9 is a block diagram of an exemplary internal configuration of the resource reserving unit in the data packet communication node of FIG. 8.

The resource reservation using this virtual connection is carried out at a resource reserving unit 361 of the data packet communication node shown in FIG. 8, which has a configuration as shown in FIG. 9, for example. In the resource reserving unit 361 shown in FIG. 9, the cell transmission rate necessary for providing the requested quality of service described within the received Resv message is calculated at a bandwidth request calculation unit 61, and the Modify Connection message describing that rate is transmitted to the ATM network at a message transmission unit 62. Then, when the Modify Answer message sent from the ATM network in response to the Modify Connection message is received at a message receiving unit 63 of the resource reserving unit 361, the Modify Response message corresponding to that Modify Answer message is transmitted to the ATM network at a message transmission unit 62, and whether the change of the cell transmission rate is accepted or not is judged according to an information within the received Modify Response message at a reservation success/failure judgement unit 64. Then, the Resv message is transmitted to the source terminal when the change to the cell transmission rate necessary for providing the requested quality of service described in the Resv message is accepted, or the Resv message is not transmitted to the source terminal when the change is not accepted.

Also, in the data packet communication node, the above described virtual connection which has a function to change the connection characteristic according to the signaling message (that is, a virtual connection which has a PCR (Peak Cell Rate), or an SCR (Sustainable Cell Rate), or both as traffic parameters) is not established in advance, and the UBR connection is established between the data packet communication nodes first and the IP data packet to be transferred is accommodated on that UBR connection. Then, when the Resv message sent from the destination terminal, the Resv message sent from the source terminal, or the Path message sent from the source terminal is received at that node, the connection for accommodating that IP data packet is changed from the UBR connection to the above described connection.

At this point, the transmission rate (the above described PCR or SCR) at that connection is set to the transmission rate capable of providing the requested quality described in the Resv message, or to the transmission rate calculated according to the traffic characteristic of the IP data packet described within the Path message. Else, it is also possible to set the transmission rate value determined in advance within the data packet communication node. Then, after the virtual connection for connecting the communication nodes is changed as described above, the change of the cell transmission rate according to the signaling message is carried out every time the Resv message sent from the destination terminal is received.

Now, the first embodiment of a node device and a network resource reservation method according to the present invention will be described in further detail.

FIG. 1 shows a configuration of the data packet communication network in this first embodiment.

As shown in FIG. 1, this data packet communication network comprises: a source terminal 111 which functions as a side for sending the IP data packet containing a communication information generated by a user; a destination terminal 112 which functions as a side for receiving the IP data packet; a data packet communication node 121 which is directly connected with the source terminal 111; a data packet communication node 123 which is directly connected with the destination terminal 112; a data packet communication node 122 which is located between the data packet communication node 121 and the data packet communication node 123; an ATM network 129 for connecting the data packet communication node 121 and the data packet communication node 122; and an ATM network 130 for connecting the data packet communication node 122 and the data packet communication node 123.

Within the ATM networks 129 and 130, ATM switches 131 to 134 for switching and transferring ATM cells are provided, and virtual connections (virtual path connections/virtual channel connections) 151 and 152 are established between the adjacent data packet communication nodes via these ATM switches 131 to 134.

Note that, in FIG. 1, each of 141 and 142 indicates a connection at the IP level which is virtually established from a viewpoint of the IP data packet, and 16 indicates a packet flow of the IP data packet sent from the source terminal 111 to the destination terminal 112.

FIG. 1 shows only one user terminal which is directly connected with each of the data packet communication nodes 121 and 123, but it is also possible to directly connect more than one user terminals. Also, FIG. 1 shows only one data packet communication node 122 which is located between the data packet communication nodes 121 and 123, but it is also possible to provide more than one such intermediate data packet communication nodes. Also, FIG. 1 shows two ATM switches between each adjacent data packet communication nodes, but it is also possible to provide just one or more than two ATM switches between each adjacent data packet communication nodes.

In a case of carrying out the IP packet transfer from one of the adjacent data packet communication nodes to the other one of the adjacent data packet communication nodes in this data packet communication network, each of the data packet communication nodes 121 to 123 divides and converts the IP packet into ATM cells once, and these ATM cells are transferred through the virtual connections 151 and 152 established between the data packet communication nodes. Then, the data packet communication node which received these ATM cells converts the received ATM cells into the IP packet.

In a case where the above described RSVP is implemented on the data packet communication network shown in FIG. 1, as shown in FIG. 2, the destination terminal 112 which requests the quality of service for the transfer of the IP data packets 211 and 212 transmits the Resv message 22 to the source terminal 111 according to the need. The data packet communication node which received this Resv message judges whether it is possible to provide the requested quality of service described in this Resv message, and if it is possible, the network resources necessary for providing the requested quality of service are reserved.

In the data packet communication network shown in FIG. 1, the IP data packet transfer between the adjacent data packet communication nodes is carried out via the ATM networks, so that the data packet communication node which received the Resv message reserves the bandwidth of the virtual connection for carrying out the communication of the IP data packet indicated by the Resv message which can satisfy the requested quality of service. Also, prior to this resource reservation according to the Resv message, the data packet communication node carries out the establishing of the ABT connection as described above.

Next, the data packet communication node in this first embodiment will be described in further detail.

FIG. 3 shows an exemplary configuration of the data packet communication node 122 which is located between the data packet communication nodes 121 and 123, while FIG. 4 shows an exemplary configuration of the data packet communication nodes 121 and 123 which are directly connected with the terminals 111 and 112, respectively. In this first embodiment, the terminal 111 is assumed to be the source side and the terminal 112 is assumed to be the destination side, but the data packet communication nodes of FIG. 3 and FIG. 4 have such configurations that either one of the terminals 111 and 112 can be the source side or the destination side.

The data packet communication node 122 of FIG. 3 includes a cell receiving unit 31, an IP packet generation unit 32, a packet cell assembling unit 33, a cell transmission unit 34, an IP packet identifying unit 35, a resource reserving unit 36, a connection re-establishing unit 37, and an accommodating connection determining unit 38. The basic functions of each of these elements are as follows.

The cell receiving unit 31 receives the transferred ATM cells sent to this data packet communication node.

The IP packet generation unit 32 converts the ATM cells received at the cell receiving unit 31 into an IP packet.

The packet cell assembling unit 33 divides and converts the IP packet generated at the IP packet generation unit 32 into the ATM cells.

The cell transmission unit 34 transmits the ATM cells generated at the packet cell assembling unit 33 to the next data packet communication node.

The IP packet identifying unit 35 identifies a content of the IP packet generated at the IP packet generation unit 32.

The resource reserving unit 36 carries out the processing for reserving the bandwidth of the virtual connection necessary for satisfying the requested quality of service described in the Resv message, according to a control packet which is identified as the Resv message at the IP packet identifying unit 35.

The connection re-establishing unit 37 re-establishes the virtual connection according to the traffic characteristic described in the Resv message or the Path message, according to a control packet which is identified as the Resv message or the Path message at the IP packet identifying unit 35.

The accommodating connection determining unit 38 determines the virtual connection for accommodating the IP packet generates at the IP packet generation unit 32, and notifies the determined virtual connection to the cell transmission unit 34.

The data packet communication node 121 or 123 of FIG. 4 includes an IP packet receiving unit 30 and an IP packet transmission unit 39 for receiving and transmitting the IP packet with respect to the terminal 111 or 112, in addition to the elements similar to the data packet communication node 122 of FIG. 3. The basic functions of each of these elements are basically similar to a case of FIG. 3 described above, but the connection relationship among these elements is slightly different as follows.

The IP packet receiving unit 30 receives the IP packet transferred from the directly connected user terminal.

The packet cell assembling unit 33 divides and converts the IP packet received at the IP packet receiving unit 30 into the ATM cells.

The cell transmission unit 34 transmits the ATM cells generated at the packet cell assembling unit 33 to the next data packet communication node.

The cell receiving unit 31 receives the transferred ATM cells sent to this data packet communication node.

The IP packet generation unit 32 converts the ATM cells received at the cell receiving unit 31 into an IP packet.

The IP packet transmission unit 39 transfers the IP packet generated at the IP packet generation unit 32 to the directly connected user terminal.

The IP packet identifying unit 35 identifies a content of the IP packet received at the IP packet receiving unit 30 or the IP packet generated at the IP packet generation unit 32.

The resource reserving unit 36 carries out the processing for reserving the bandwidth of the virtual connection necessary for satisfying the requested quality of service described in the Resv message, according to a control packet which is identified as the Resv message at the IP packet identifying unit 35. This processing is carries out at either one of the data packet communication node directly connected with the source terminal or the data packet communication node directly connected with the destination terminal.

The connection re-establishing unit 37 re-establishes the virtual connection according to the traffic characteristic described in the Resv message or the Path message, according to a control packet which is identified as the Resv message or the Path message at the IP packet identifying unit 35. This processing is carried out at the data packet communication node directly connected with the source terminal in this first embodiment.

The accommodating connection determining unit 38 determines the virtual connection for accommodating the IP packet generates at the IP packet generation unit 32, and notifies the determined virtual connection to the cell transmission unit 34.

In the data packet communication node of FIG. 4, unlike the data packet communication node of FIG. 3, the IP packet transmitted from the source terminal is received at the IP packet receiving unit 30 of the data packet communication node, divided and converted into the ATM cells at the packet cell assembling unit 33, and transmitted from the cell transmission unit 34. Also, the ATM cells received at the cell receiving unit 31 are converted into the IP packet at the IP packet generation unit 32, and transferred to the destination terminal from the IP packet transmission unit 39.

As described above, for the virtual connection to be established between the data packet communication nodes, the ABT connection for providing the ABT service is adopted. In the ABT, as indicated in FIG. 5, it is possible to dynamically change a transmission rate of cells belonging to an ATM block which is enclosed by adjacent RM (Resource Management) cells 41 and 42, without re-establishing the virtual connections, so that it is not necessary to re-establish the virtual connections every time the change of the requested quality of service occurs.

At a time of establishing the ABT connection, only the maximum cell transmission rate that can be provided by that connection is specified, and when it is desired to reserve the network resources for the purpose of cell transfer, the data packet communication node of the upstream side enters the desired cell transmission rate in the RM cell 41 located at the top of the ATM block, and transmits this RM cell to the data packet communication node of the downstream side.

At the ATM network through which this RM cell passes, whether it is possible to reserve the bandwidth necessary for providing the requested cell transmission rate described in this RM cell or not is judged, and the RM cell with the CI bit indicating 0 is transmitted when it is possible to reserve that bandwidth, or the RM cell with the CI bit indicating 1 is transmitted when it is not possible to reserve that bandwidth, from a UNI (User Network Interface) unit (not shown, which is to be provided within the cell receiving unit 31 and the cell transmission unit 34 in the configuration of FIG. 3 or FIG. 4) of the data packet communication node of the downstream side to the data packet communication node of the upstream side. Then, at the data packet communication node of the upstream side, the cell transfer according to the requested cell transmission rate is started when the RM cell with the CI bit indicating 0 is received, or the rejection of the requested cell transmission rate is recognized when the RM cell with the CI bit indicating 1 is received. Then, in a case of terminating the cell transfer at the requested cell transmission rate, the RM cell 42 is transmitted.

Also, in the ABT connection, it is possible to request the change of the cell transmission rate from the data packet communication node of the downstream side.

In this case, the RM cell in which the requested rate is described is transmitted from the data packet communication node of the downstream side to the data packet communication node of the upstream side, and whether it is possible to reserve the bandwidth necessary for providing the requested rate or not is judged at the ATM network through which that RM cell passes. Then, at the UNI unit of the data packet communication node of the upstream side, the RM cell with the CI bit indicating 0 is transmitted when it is possible to reserve that bandwidth, or the RM cell with the CI bit indicating 1 is transmitted, to the data packet communication node of the downstream side.

In the following, the operation of the data packet communication nodes of FIG. 3 and FIG. 4 will be described in detail for three cases of the IP packet transfer, the resource reservation, and the virtual connection establishing, separately.

First, the basic operation of the data packet communication nodes at a time of transferring the IP data packet between the user terminals 111 and 112 will be described.

The IP packet transmitted from the source terminal 111 to the data packet communication node 121 in the configuration as shown in FIG. 4 is received at the IP packet receiving unit 30, then divided and converted into the ATM cells at the packet cell assembling unit 33, and temporarily stored in a buffer (not shown). On the other hand, the IP packet identifying unit 35 identifies a content of the received IP packet, and in this case, a content of the IP packet is the data to be transferred so that the identifier of the IP packet is read out and given to the accommodating connection determining unit 38. The accommodating connection determining unit 38 has a correspondence table for the identifier of the IP packet and the identifier of the accommodating virtual connection, so that the identifier of the accommodating virtual connection for that IP packet is obtained from the identifier of the IP packet given from the IP packet identifying unit 35, and both of these identifiers are notified to the cell transmission unit 34. The cell transmission unit 34 then transmits the IP packet temporarily stored in the buffer to the corresponding virtual connection.

The IP packet transmitted from the data packet communication node 121 in this manner is transferred up to the data packet communication node 122 in forms of ATM cells by the virtual connection 151 established within the ATM network 129.

The ATM cells generated by dividing and converting the above IP packet are received at the cell receiving unit 31 of the data packet communication node 122 in the configuration as shown in FIG. 3, and converted into the IP packet at the IP packet generation unit 32 once. Then, this IP packet is divided and converted into the ATM cells again at the packet cell assembling unit 33, and temporarily stored in a buffer (not shown). On the other hand, the IP packet identifying unit 35 identifies a content of the received IP packet, and in this case, a content of the IP packet is the data to be transferred so that the identifier of the IP packet is read out and given to the accommodating connection determining unit 38. The accommodating connection determining unit 38 has a correspondence table for the identifier of the IP packet and the identifier of the accommodating virtual connection, so that the identifier of the accommodating virtual connection for that IP packet is obtained from the identifier of the IP packet given from the IP packet identifying unit 35, and both of these identifiers are notified to the cell transmission unit 34. The cell transmission unit 34 then transmits the IP packet temporarily stored in the buffer to the corresponding virtual connection.

In a case where there are more than one data packet communication nodes 122 located between the data packet communication nodes, the operation as described above is carried out at each one of these data packet communication nodes 122.

The IP packet transmitted from the data packet communication node 122 in this manner is transferred up to the data packet communication node 123 in forms of ATM cells by the virtual connection 152 established within the ATM network 130.

The ATM cells generated by dividing and converting the above IP packet are received at the cell receiving unit 31 of the data packet communication node 123 in the configuration as shown in FIG. 4, converted into the IP packet at the IP packet generation unit 32, and then transferred to the destination terminal 112 from the IP packet transmission unit 39.

Note that, in a case where the received IP data packet is a newly transferred one, the accommodating virtual connection is not yet established, so that each data packet communication node establishes the virtual connection, and carries out the registration of the identifier of the IP data packet and the identifier of the accommodating virtual connection into the correspondence table while carrying out the operation as described above.

Also, in a case of transferring the Path message from the source terminal 111 to the destination terminal 112, the operation similar to that described above is carried out. Here, however, in a case of carrying out the establishing of the ABT connection according to the Path message, the processing as described below will be carried out at each data packet communication node in addition.

Also, in a case of transferring the Resv message from the destination terminal 112 to the source terminal 111, the operation similar to that described above (with the user terminal 112 as the destination terminal and the user terminal 111 as the source terminal) is carried out, but there are cases in which the Resv message is discarded at some data packet communication node. Also, at each data packet communication node, in addition to the above operation, the processing for carrying out the resource reservation according to the Resv message and the processing necessary in a case of carrying out the establishing of the ABT connection according to the Resv message will be carried out.

Next, the operation in a case of the resource reservation to be carried out according to the Resv message transferred from the destination terminal 112 to the source terminal 111 will be described.

FIG. 6 is an exemplary internal configuration of the resource reserving unit 36 for carrying out the resource reservation. This resource reserving unit 36 of FIG. 6 has a requested bandwidth calculation unit 51, an RM cell transmission unit 52, an RM cell receiving unit 53, and a reservation success/failure judgement unit 54.

In a case where the generated IP packet or the received IP packet is identified as the Resv message at the IP packet identifying unit 35 of FIG. 3 or FIG. 4, when the ABT connection is already established as the accommodating virtual connection for the IP data packet having a corresponding identifier, the resource reserving unit 36 carries out the resource reservation for that connection.

At the requested bandwidth calculation unit 51 of the resource reserving unit 36, the cell transmission rate value necessary for satisfying the requested quality of service for the IP data packet described in the Resv message is calculated.

The RM cell transmission unit 52 enters the calculated cell transmission rate value into the RM cell, and gives this RM cell to the cell transmission unit 34, in order to inquire the ATM network as to whether the cell transfer at the cell transmission rate value calculated by the requested bandwidth calculation unit 51 is possible or not.

Here, the Resv message is maintained in a buffer (not shown).

The RM cell transmitted from the cell transmission unit 34 is turned around at the UNI unit of the adjacent data packet communication node as described above, and returned to this data packet communication node. The returned RM cell is directly given from the cell receiving unit 31 to the RM cell receiving unit 53 of the resource reserving unit 36. This RM cell receiving unit 53 holds the RM cell given from the cell receiving unit 31.

The reservation success/failure judgement unit 54 judges whether the cell transfer at the cell transmission rate value calculated by the requested bandwidth calculation unit 51 is possible or not, according to a content (the CI bit value) of the RM cell held in the RM cell receiving unit 53.

When the transfer at the calculated rate value is judged as possible at the reservation success/failure judgement unit 54, the accommodating connection determining unit 38 is commanded to transmit the Resv message maintained in the buffer to the source terminal 111, whereas when the transfer at the calculated rate value is judged as impossible, the accommodating connection determining unit 38 is commanded to stop the transmission of the Resv message.

Note that, at the data packet communication node 121 which is directly connected with the source terminal 111, when the reserving of the resources succeeded, the maintained Resv message is given to the source terminal 111.

Even when the virtual connection connecting the data packet communication nodes does not provide the ABT service, in a case of providing a connection which is capable of changing the connection characteristic such as the cell transmission rate according to the signaling message as shown in FIG. 7, by utilizing this connection, it is also possible to realize the network resource reservation in the data packet communication network which connects the data packet communication nodes.

FIG. 8 shows an exemplary configuration of the data packet communication node in a case of being connected with the virtual connection which is capable of changing the cell transmission rate according to the signaling message. In order to deal with the signaling message, the configuration of FIG. 8 includes a message transmission unit 391 for transmitting the signaling message generated at this node, and a message receiving unit 392 for receiving the signaling message transmitted from the ATM network. The rest of this configuration of FIG. 8 is identical to the data packet communication node shown in FIG. 3.

FIG. 9 shows an exemplary internal configuration of a resource reserving unit 361 in the configuration of FIG. 8. This configuration of the resource reserving unit 361 shown in FIG. 9 is basically similar to the resource reserving unit shown in FIG. 6, except that the RM cell transmission unit 52 and the RM cell receiving unit 53 of FIG. 6 are replaced by a message transmission unit 62 for transmitting to the ATM network the Modify Connection message which requests the correction of the virtual connection so that the cell transfer at the cell transmission rate value calculated at the requested bandwidth calculation unit 61 becomes possible and the Modify Response message for indicating the reception of the Modify Answer message transmitted from the ATM network at the resource reserving unit 361, and a message receiving unit 63 for receiving the Modify Response message transmitted from the ATM network.

Next, two types of the network resource reservation procedures to be carried out by using the Resv message in a case where the virtual connection connecting the data packet communication nodes provides the ABT service will be described.

First, with reference to FIG. 10, the first resource reservation procedure will be described.

In this case, the resource reservation is carried out by the data packet communication node 121 which is directly connected with the source terminal 111 and the data packet communication node 122 which is located between the data packet communication nodes.

Figure 10:
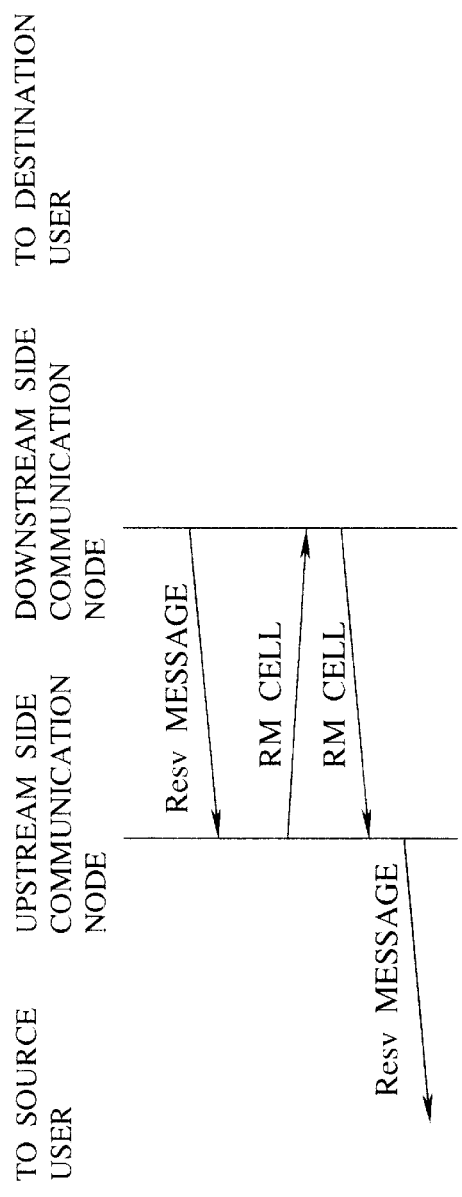
FIG. 10 is a sequence diagram for explaining a first example of a resource reservation procedure in the data packet communication network of FIG. 1 according to the first embodiment of the present invention.

In FIG. 10, the data packet communication node which received the Resv message transmits to the data packet communication node of the downstream side the RM cell indicating the resource reservation request for the ABT connection which is established between this data packet communication node and the data packet communication node of the downstream side which transmitted that Resv message. Then, when the data packet communication node which transmitted the RM cell receives the RM cell with CI=0, it is recognized that the reservation of the requested amount of resources at that connection was successfully made, and the received Resv message is transmitted to the user terminal of the data packet source side.

Next, with reference to FIG. 11, the second resource reservation procedure will be described.

In this case, the resource reservation is carried out by the data packet communication node 123 which is directly connected with the destination terminal 112 and the data packet communication node 122 which is located between the data packet communication nodes.

Figure 11:
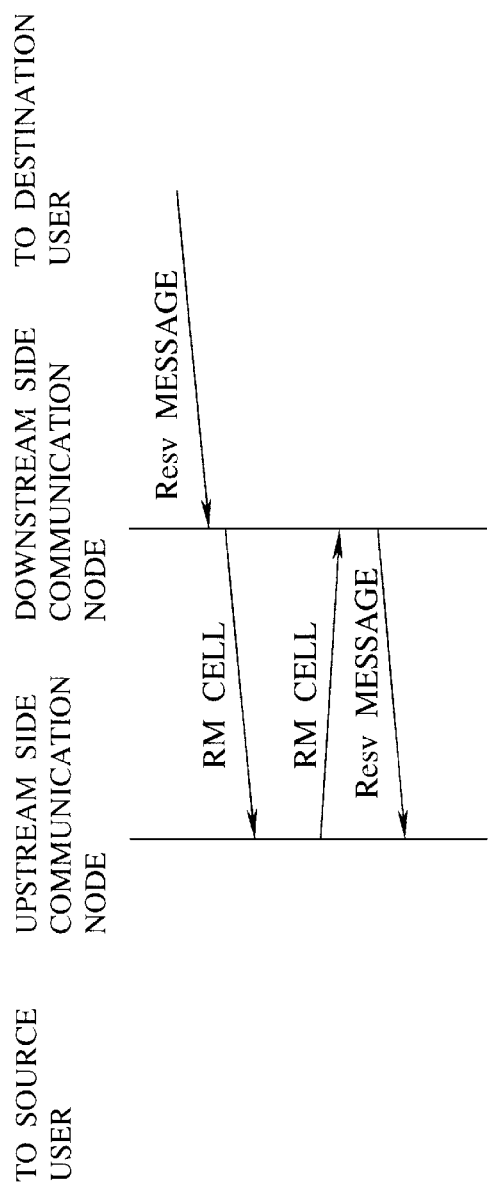
FIG. 11 is a sequence diagram for explaining a second example of a resource reservation procedure in the data packet communication network of FIG. 1 according to the first embodiment of the present invention.

In FIG. 11, the data packet communication node which received the Resv message transmits to the data packet communication node of the upstream side the RM cell indicating the resource reservation request for the ABT connection which is established between this data packet communication node and the data packet communication node of the upstream side which transmitted the IP data packet to this data packet communication node. Then, when the data packet communication node which transmitted the RM cell receives the RM cell with CI=0, it is recognized that the reservation of the requested amount of resources at that connection was successfully made, and the received Resv message is transmitted to the user terminal of the data packet source side.

Next, the establishing policy at a time of establishing a virtual connection between the adjacent data packet communication nodes in conjunction with the start of the IP data packet transmission will be described. This establishing policy specifies the operation at the connection re-establishing unit 37 in the data packet communication node of FIG. 3 or FIG. 4, and its result is notified to the accommodating connection determining unit 38.

Next, with references to FIG. 12 to FIG. 14, three types of the virtual connection establishing procedures to be carried out between the adjacent data packet communication nodes will be described.

First, with reference to FIG. 12, the first virtual connection establishing procedure will be described.

Figure 12:
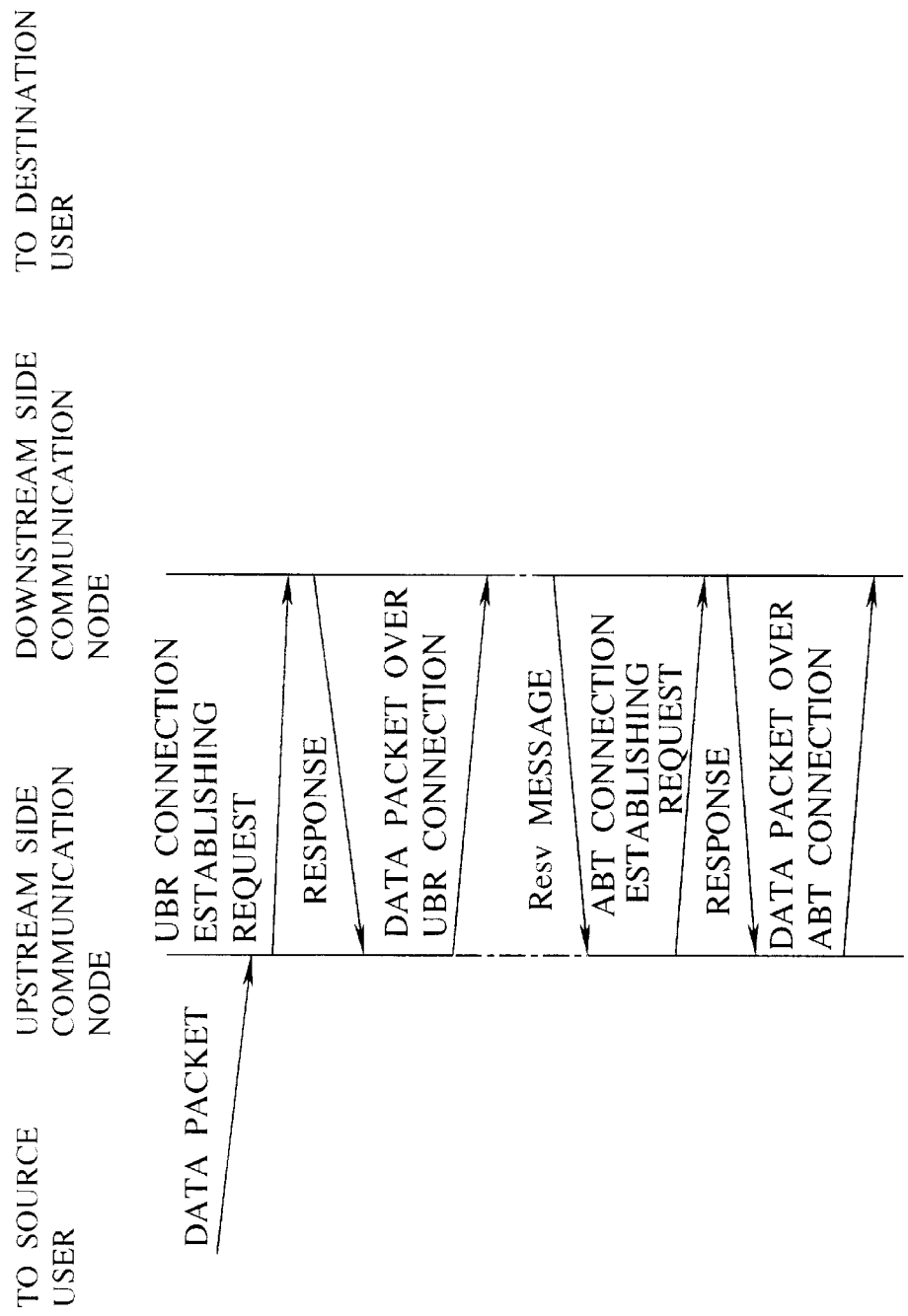
FIG. 12 is a sequence diagram for explaining a first example of a virtual connection establishing procedure in the data packet communication network of FIG. 1 according to the first embodiment of the present invention.

In FIG. 12, when the (new) IP data packet for which the accommodating virtual connection does not exist is received at the data packet communication node, this data packet communication node establishes the UBR connection, which does not guarantee any quality for the cell transfer, between the adjacent data packet communication nodes, and accommodates that IP data packet on this UBR connection. At this point, the correspondence between this IP data packet and the UBR connection is registered in the accommodating connection determining unit 38. When the Resv message for this IP data packet is received from the destination terminal at this data packet communication node, the connection re-establishing unit 37 changes the virtual connection for accommodating this IP data packet from the UBR connection to the ABT connection. Namely, the UBR connection does not guarantee any quality for the cell transfer, so that this UBR connection is replaced by the ABT connection which is capable of reserving the resources for satisfying the requested quality of service described in the Resv message.

At this point, for the maximum cell transmission rate at the ABT connection, either a value determined in advance within the data packet communication node is adopted, or when a Path message sent from the source terminal to the destination terminal is already received at that data packet communication node, the maximum cell transmission rate to be provided by the ABT connection is calculated in advance according to the traffic characteristic of the IP data packet described within the Path message, and the calculated value is adopted at a time of the ABT connection establishing. Then, when the change of the accommodating connection to the ABT connection is finished, this is notified to the accommodating connection determining unit 38.

Next, with reference to FIG. 13, the second virtual connection establishing procedure will be described.

Figure 13:
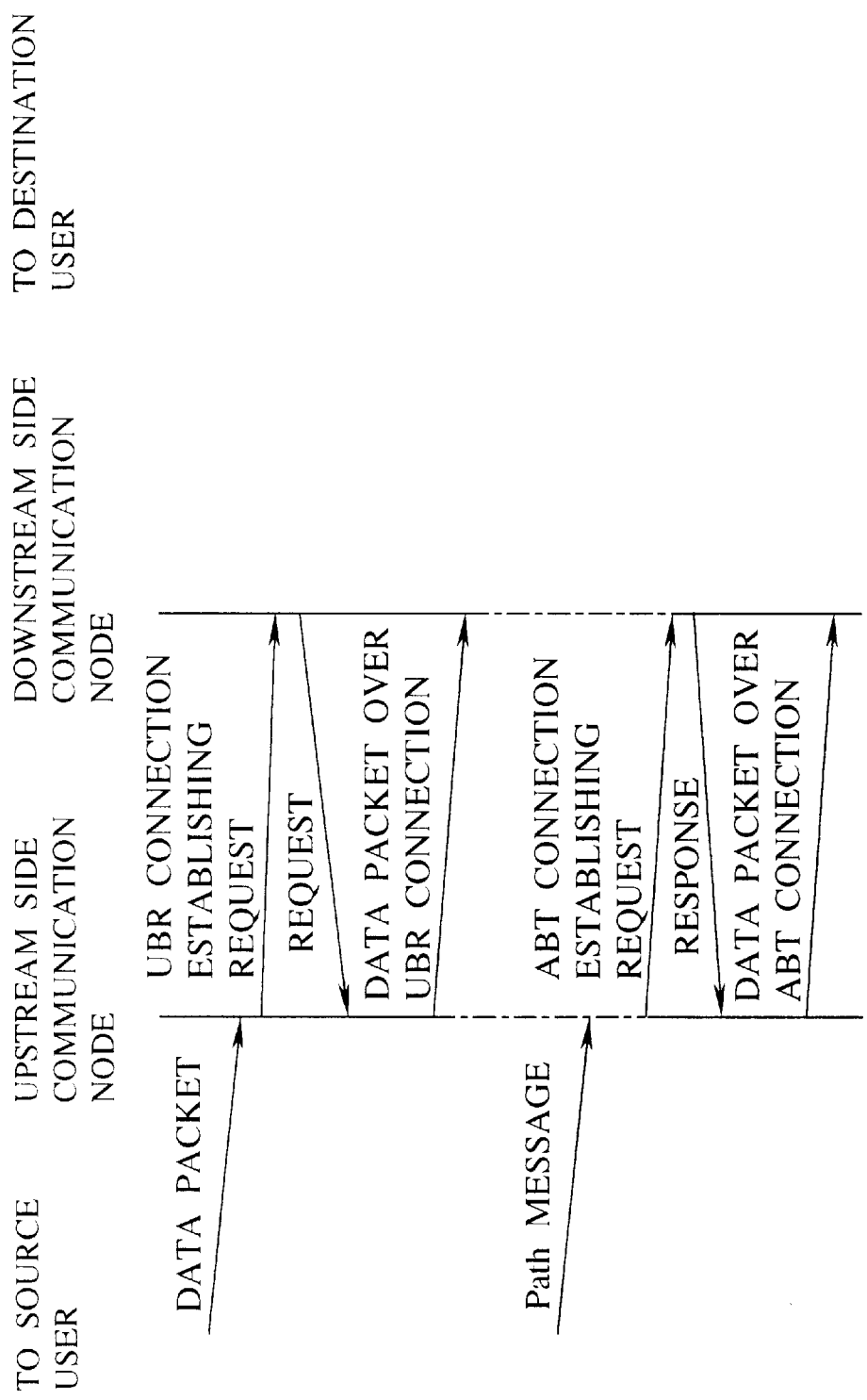
FIG. 13 is a sequence diagram for explaining a second example of a virtual connection establishing procedure in the data packet communication network of FIG. 1 according to the first embodiment of the present invention.

In FIG. 13, when the (new) IP data packet for which the accommodating virtual connection does not exist is received at the data packet communication node, this data packet communication node establishes the UBR connection between the adjacent data packet communication nodes, and accommodates that IP data packet on this UBR connection. At this point, the correspondence between this IP data packet and the UBR connection is registered in the accommodating connection determining unit 38. When the Path message for this IP data packet is received from the source terminal at this data packet communication node, the connection re-establishing unit 37 changes the virtual connection for accommodating this IP data packet from the UBR connection to the ABT connection.

At this point, for the maximum cell transmission rate at the ABT connection, a value calculated according to the traffic characteristic of the IP data packet described within the Path message is adopted. Then, when the change of the accommodating connection to the ABT connection is finished, this is notified to the accommodating connection determining unit 38.

Next, with reference to FIG. 14, the third virtual connection establishing procedure will be described.

Figure 14:
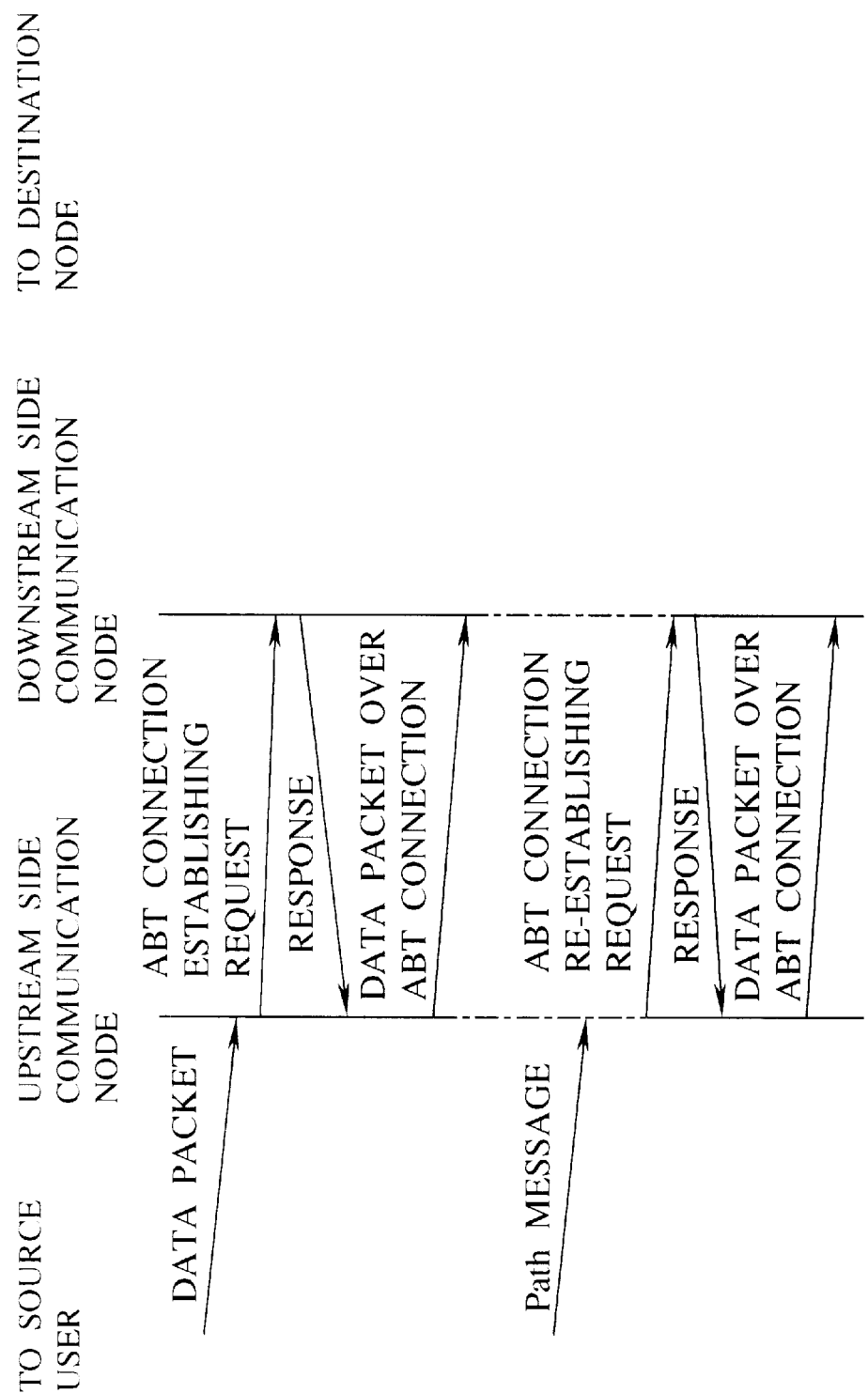
FIG. 14 is a sequence diagram for explaining a third example of a virtual connection establishing procedure in the data packet communication network of FIG. 1 according to the first embodiment of the present invention.

In FIG. 14, when the (new) IP data packet for which the accommodating virtual connection does not exist is received at the data packet communication node, this data packet communication node establishes the ABT connection, with a value determined in advance within the data packet communication node (the maximum cell transmission rate value of a physical transmission path which accommodates that connection, for example) as the maximum cell transmission rate, between the adjacent data packet communication nodes, and accommodates that IP data packet on this ABT connection. At this point, the correspondence between this IP data packet and the ABT connection is registered in the accommodating connection determining unit 38. When the Path message for this IP data packet is received from the source terminal at this data packet communication node, the connection re-establishing unit 37 carries out the re-establishing of the ABT connection.

At this point, for the maximum cell transmission rate at the ABT connection, a value calculated according to the traffic characteristic of the IP data packet described within the Path message is adopted. Then, when the re-establishing of the ABT connection is finished, this is notified to the accommodating connection determining unit 38.

Three types of the connection establishing procedures and two types of the resource reservation procedures described above can be used in any desired combination. In addition, it is also possible to use the first virtual connection establishing procedure and the second virtual connection establishing procedure together, for example.

Figure 15:
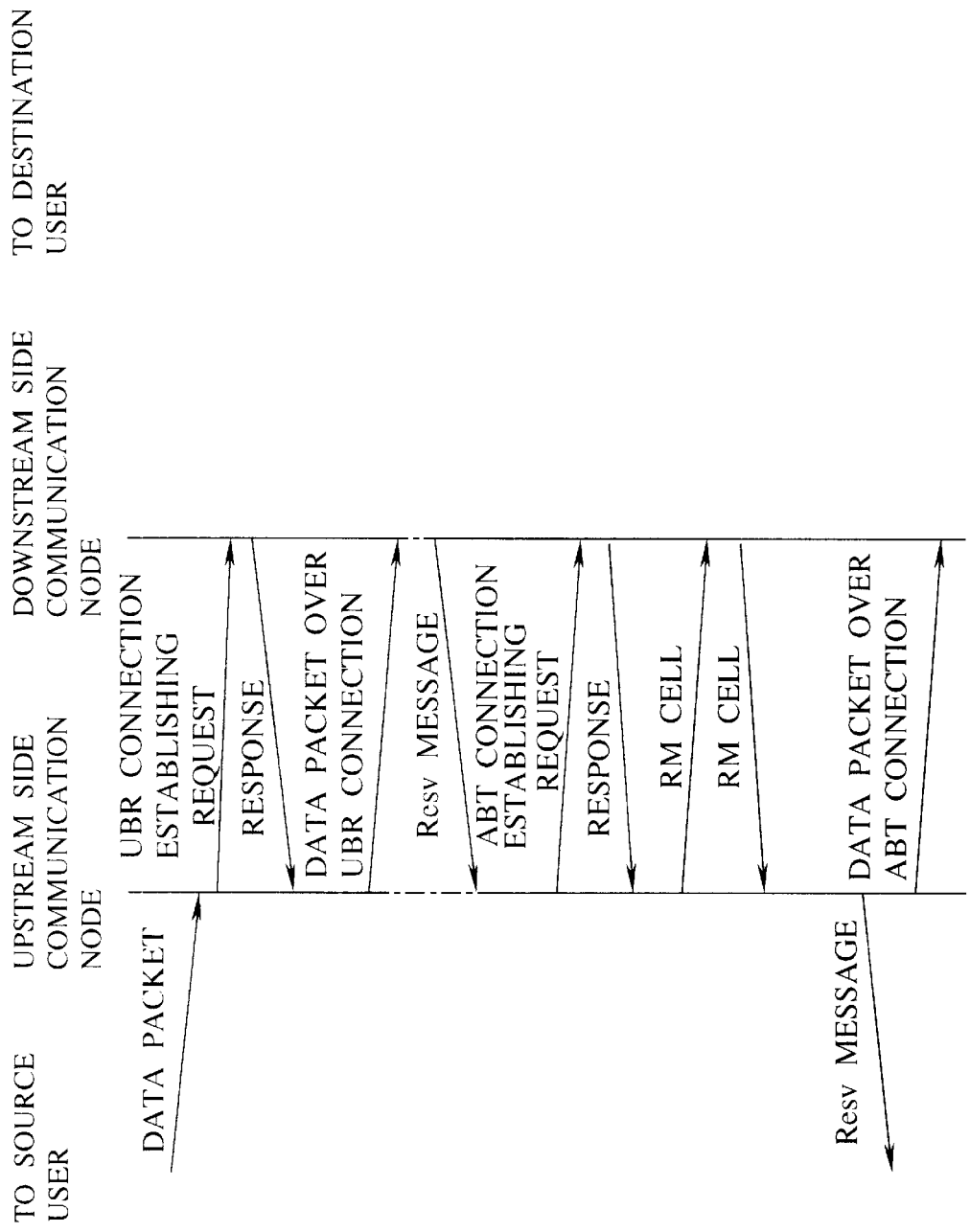
FIG. 15 is a sequence diagram for explaining an exemplary case of combining the first resource reservation procedure of FIG. 10 and the first virtual connection establishing procedure of FIG. 12.

FIG. 15 shows an exemplary procedure in a case of combining the first resource reservation procedure of FIG. 10 and the first virtual connection establishing procedure of FIG. 12.

In this case, upon receiving the Resv message, the establishing of the ABT connection is carried out first, and then, the resource reservation is carried out, and when the resources are successfully reserved, the Resv message is transmitted.

As described, according to this first embodiment of the present invention, at a time of delivering the data packet through the ATM network, when there is a request for the quality of service made by the reservation message (Resv message) of the resource reservation protocol (RSVP) sent from the destination side user terminal, it is possible to provide the service which satisfies this request for the quality of service by reserving the resources of the virtual connections on the ATM network according to that reservation message.

In addition, according to this first embodiment of the present invention, by utilizing the virtual connection provided by the ATM network which is capable of providing a service in which the amount of resources can be changed without re-establishing the connection, it is possible to realize the network resource reservation according to the reservation message (Resv message) defined by the resource reservation protocol (RSVP) without re-establishing the virtual connection already established in the ATM network.

Moreover, according to this first embodiment of the present invention, it is possible to utilize the network resources efficiently by establishing the virtual connection capable of providing a service in which the amount of resources can be changed without re-establishing the connection after a prescribed message (Path message or Resv message) in the resource reservation protocol (RSVP) is received for the first time, and by establishing the virtual connection which does not guarantee any quality for the cell transfer until that prescribed message is received.

Referring now to FIG. 16 to FIG. 20, the second embodiment of a node device and a network resource reservation method according to the present invention will be described in detail.

First, the basic configuration and outline of this second embodiment will be described.

In this second embodiment, a data packet communication network has a configuration similar to that of FIG. 1 described above.

In the data packet communication network of this second embodiment, as the services for the IP packets, the Guaranteed Quality of Service, the Predictive Quality of Service, and the Best-Effort Service as already mentioned above are provided. In this data packet communication network, the Controlled Delay Quality of Service will be handled as a part of the Predictive Quality of Service. The brief outlines of these services are as follows.

(1) Guaranteed Quality of Service

This is a service which guarantees that the IP data packet delivery is carried out within a prescribed period of time for sure. For the quality of service, the transmission rate value is to be requested.

(2) Predictive Quality of Service

This is a service which guarantees that the IP data packet delivery is carried out within a prescribed period of time at high probability. For the service quality, the service level (1, 2, 3) is to be requested, where the relative delay is less for the smaller service level value. In addition, an upper limit for a required transfer time with respect to each service level is set up at each data packet communication node.

(3) Best-Effort Service

This is a service which does not guarantee any quality, so that no quality of service is to be requested.

Note that the Controlled Delay Quality of Service is a service in which the service level is to be requested as the quality of service but an upper limit for a required transfer time is not set up, and as mentioned above, this service is handled in this data packet communication network as the Predictive Quality of Service which requests the same service level.

Figure 16:
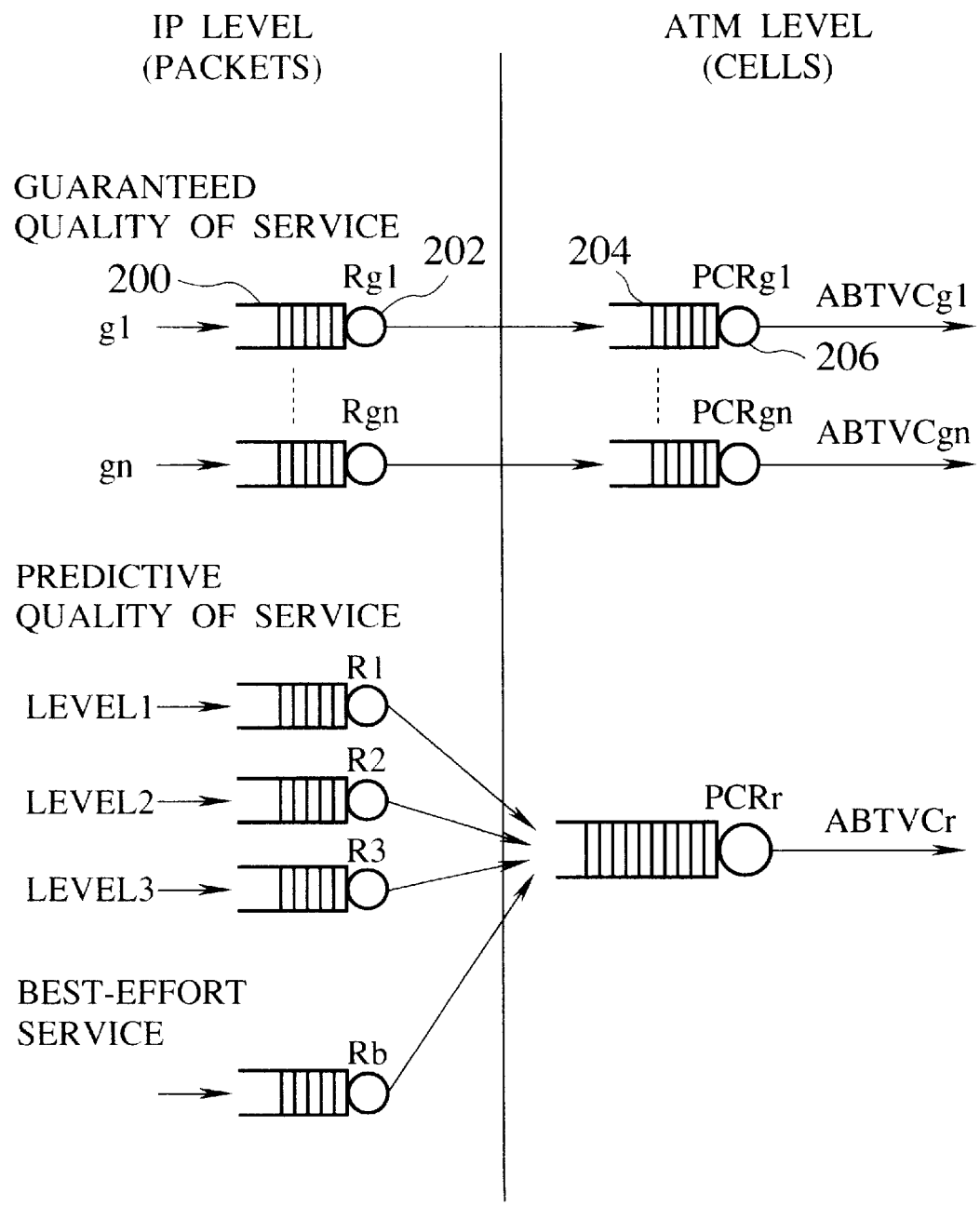
FIG. 16 is a block diagram for explaining one way of accommodating the IP data packet on the virtual connection according to the second embodiment of the present invention.
Figure 17:
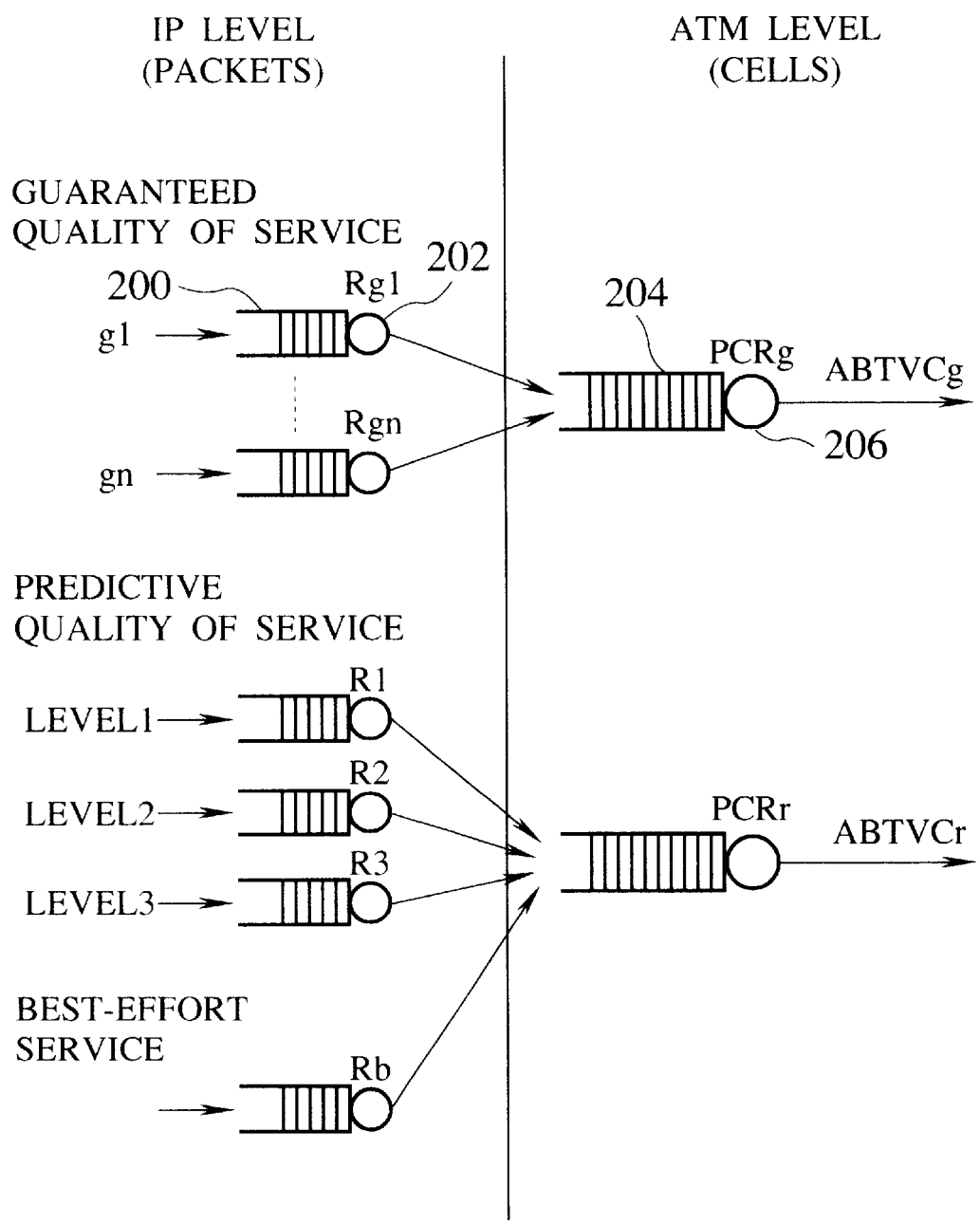
FIG. 17 is a block diagram for explaining another way of accommodating the IP data packet on the virtual connection according to the second embodiment of the present invention.

In the data packet communication node of this second embodiment, the accommodation of the IP data packet on the virtual connection is carried out as shown in FIG. 16 or FIG. 17.

In FIG. 16 and FIG. 17, the data packet communication node includes a packet buffer unit 200 for storing the packet, a packet transfer processing unit 204 for transferring the packet extracted from the buffer unit 200 to a next hop at a timing according to the allocated amount of resources, a cell buffer unit 204 for storing the ATM cells, and a cell transfer processing unit 206 for transferring the ATM cells extracted from the buffer unit 206 to the virtual connection. Note that FIG. 16 and FIG. 17 omit to show elements for converting a packet at the IP level into ATM cells.

For the Guaranteed Quality of Service, as shown in FIG. 16 and FIG. 17, at the IP level, amounts of resources Rg1 to Rgn for satisfying the transmission rate value requested by the packet are allocated to data packet flows g1 to gn, respectively. In addition, for each flow, the virtual connection (VC) for accommodating the IP data packet belonging to that flow is established, as shown in FIG. 16, or alternatively, all the flows are accommodated on the identical virtual connection, as shown in FIG. 17.

For the Predictive Quality of Service and the Best-Effort service, at the IP level, amounts of resources R1 to R3 for satisfying the upper limit of the required transfer time set up for each service level and a relationship of relative delay sizes among different service levels are allocated to the service levels of the Predictive Quality of Service, while an arbitrary value Rb within a range of not exceeding an amount of resource (referred hereafter as a residual amount of resource) is allocated to the Best-Effort Service, where the residual amount of resource is obtained by subtracting amounts of resources allocated to the Guaranteed Quality of Service and the Predictive Quality of Service from the total amount of resources allocated to the data packet communication node. Then, all the flows requesting either the Predictive Quality of Service or the Best-Effort Service are accommodated on the identical virtual connection.

An amount of bandwidth to be reserved at the virtual connection is calculated according to a total sum of amounts of resources at the IP level which are allocated to the data packet flows accommodated on that connection.

Note that, for the Predictive Quality of Service, it is also possible to adopt a scheme for using one virtual connection in correspondence to each level, or a scheme for using one virtual connection in correspondence to each flow.

In the data packet communication network of this second embodiment, the reserving of the amounts of resources at the IP level is carried out according to the resource reservation protocol called RSVP similarly as in the first embodiment described above.

In this second embodiment, the bandwidth corresponding to the calculated amount of resource at the IP level is to be reserved at the virtual connection level. Also, in this second embodiment, the virtual connections 151 and 152 to be established between the data packet communication nodes are assumed to be capable of providing the ABT service, similarly as in the first embodiment described above. For example, the data packet communication node 122 will change the amount of bandwidth for the virtual connection 152.

The data packet communication node which transmitted the RM cell 41 describing the requested quality of service can recognize whether the request is accepted or not (whether the bandwidth necessary for providing the requested cell transmission rate is reserved or not) by receiving this RM cell as returned through the ATM network. This judgement can be made by looking at a CI (Congestion Indication) bit in the received RM cell.

The ABT service includes an ABT/DT (Delayed Transmission) service in which the data cell transfer is started after receiving the returned RM cell which indicates whether the necessary bandwidth is reserved or not, and an ABT/IT (Immediate Transmission) service in which the data cell transfer can be started without waiting for the returned RM cell. In a case of using the ABT/DT service, the data cell transfer is started after the reserving of the necessary bandwidth is confirmed so that the reliable transfer is guaranteed, but the transfer delay value for the packet transferred through the ATM network is increased by a time required for confirming the reserving of the necessary bandwidth, that is, a time required until the RM cell transmitted from the source side data packet communication node returns back to this source side data packet communication node by being returned through the ATM network. On the other hand, in a case of using the ABT/IT service, the data cell transfer is started without waiting for the confirmation of the reserving of the necessary bandwidth so that the quality is not guaranteed for the already transmitted data cells when the reserving of the necessary bandwidth was actually impossible.

In the data packet communication node of this second embodiment, whether the acceptance of the newly requested service is possible or not is judged according to the resource management information at the IP level, and only when it is possible, the ATM level service according to the ABT/IT service is carried out to reserve the necessary bandwidth and start the data cell transfer.

Figure 18:
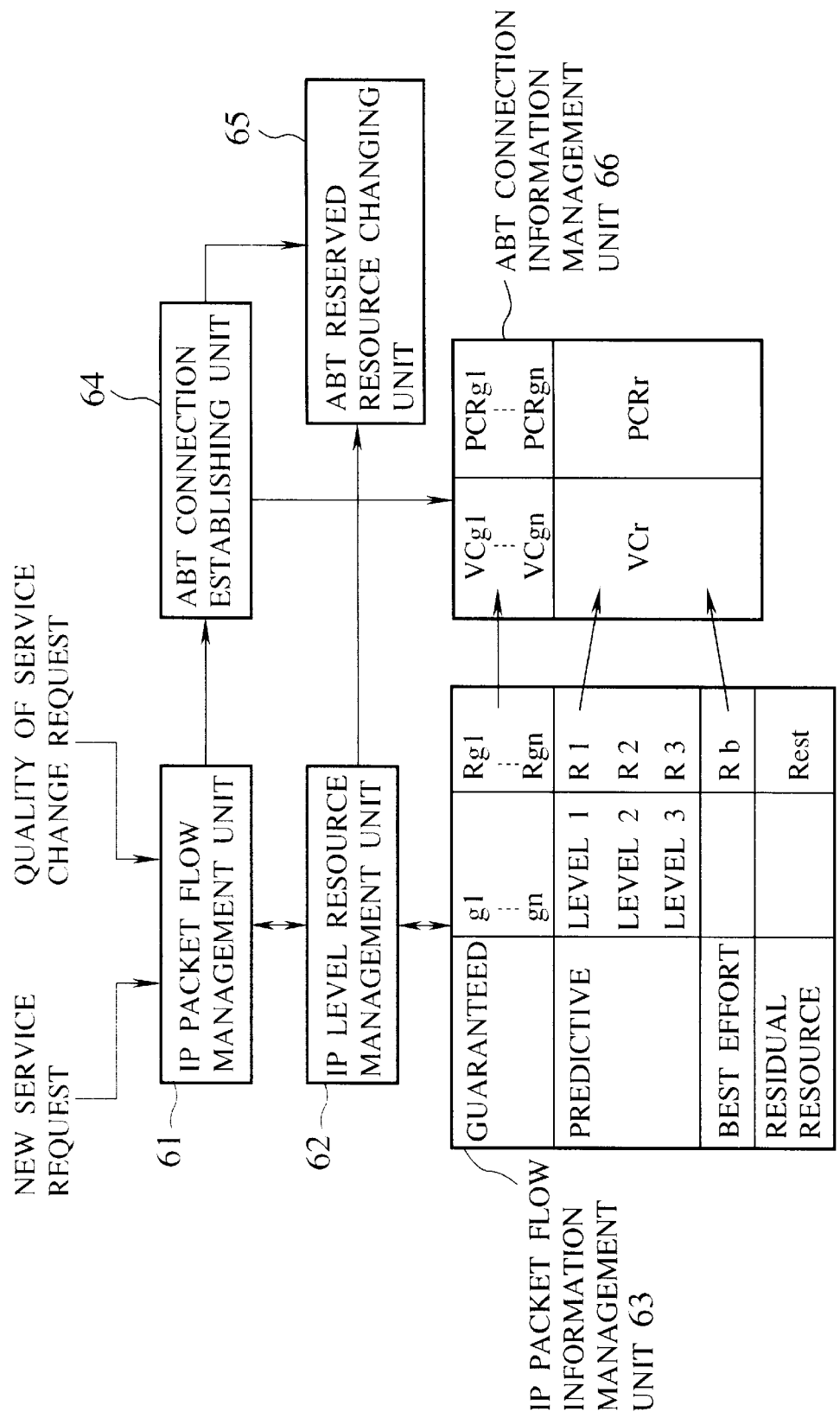
FIG. 18 is a block diagram of an exemplary configuration of a resource management unit in a data packet communication node according to the second embodiment of the present invention.

FIG. 18 shows an exemplary configuration of a resource management unit to be included as a part of the data packet communication node of this second embodiment, which should be capable of being referred from the IP packet identifying unit 35, the resource reserving unit 36, the connection re-establishing unit 37, and the accommodating connection determining unit 38 in the configuration of FIG. 3 or FIG. 4.

As shown in FIG. 18, when the data packet communication node of this second embodiment receives a quality of service change request, an IP level resource management unit 62 judges whether a sufficient amount of resources necessary for providing the requested quality exists or not according to an information in an IP packet flow information management unit 63, and if it is possible to reserve the necessary amount of resource, a request for changing an amount of resources reserved for the ABT connection is transmitted to an ABT reserved resource changing unit 65. Then, the ABT reserved resource changing unit 65 commands the transmission of the RM cell describing the amount of resource after the change to the corresponding ABT connection. Then, the ABT connection which transmitted this RM cell immediately starts the data cell transfer. The information in an ABT connection information management unit 66 is updated after the returned RM cell is received.

Figure 19:
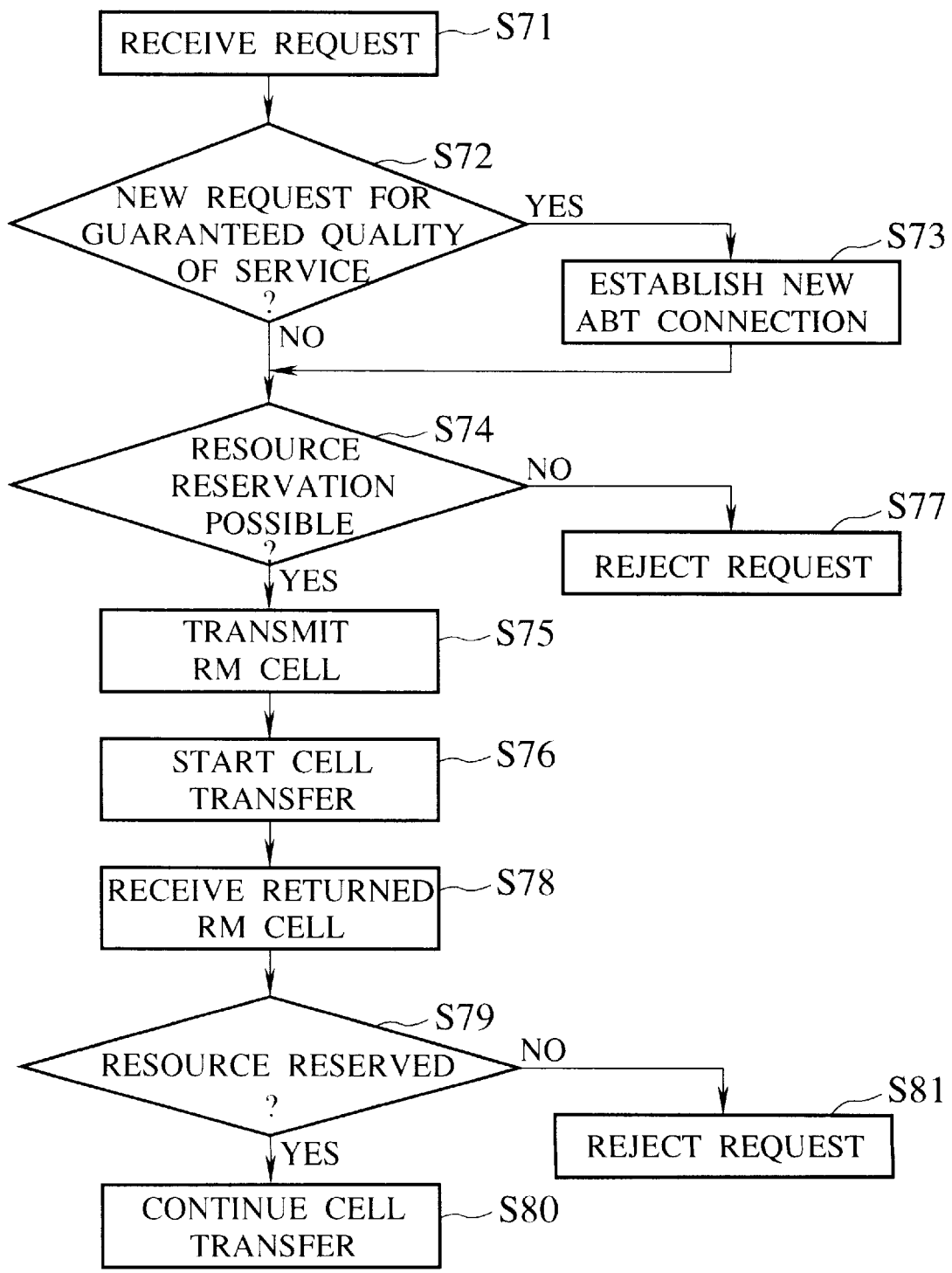
FIG. 19 is a flow chart of an operation algorithm for the resource management unit of FIG. 18.

FIG. 19 shows a flow chart for an operation algorithm of the resource management unit. As shown in FIG. 19, when the quality of service change request is made, first, whether it is possible to reserve an amount of resource necessary for providing the requested quality or not is judged according to an information at the IP level (step S74). When it is judged that it is possible to reserve the necessary amount of resource at this point, the RM cell describing the amount of resource after the change is transmitted to the corresponding ABT connection (step S75), and then the data cell transfer according to the newly requested quality of service is started (step S76). On the other hand, when it is judged that it is impossible to reserve the necessary amount of resource, the quality of service change request is rejected (step S77).

After the step S76, in order to confirm whether the reserving of the necessary amount of resource was actually carried out or not, the RM cell transmitted at the step S75 and then returned is received (step S78), and whether the reserving of the resource was actually carried out or not is judged (step S79). Then, when the reserving of the resource for the ABT connection was actually carried out, the data cell transfer according to the newly requested quality of service is continued (step S80), but when the reserving of the resource for the ABT connection was actually not carried out, the quality of service change request is rejected (step S81).

Note that, after the IP data packet transmission according to the newly requested quality of service is started at the step S76, if the necessary amount of resource could not be reserved, the IP data packet transmission according to the newly requested quality of service can be interrupted and the IP data packet transmission according to the originally requested quality of service can be resumed, or the IP data packet transmission according to the newly requested quality of service can be interrupted and the IP data packet transmission can be resumed without guaranteeing any quality at all.

According to this second embodiment, at a time of carrying out the delivery of the IP data packet through the ATM network, when the quality of service change request is made, the appropriateness of this request is judged according to the resource information at the IP level, and only when it is judged that the change is possible, the IP data packet transfer on the virtual connection which is capable of providing the ABT service and established on the ATM network is immediately started after the transmission of the RM cell indicating the request for changing the reserved amount of resource, so that it is possible to resolve the delay caused by waiting for a notice regarding the quality of service change request accept/reject judgement which is to be notified from the ATM network, and consequently, it becomes possible to provide a fast data packet transfer service.

Note that the above description is directed to a case in which the quality of service for the IP data packet sent from the source terminal is requested to the data packet communication network by the destination terminal, and the reservation of the resource for satisfying that request is carried out at the data packet communication network. However, instead of that, it is also possible to carry out the resource reservation in response to a message (such as a Path message of the RSVP) sent from the source terminal to the destination terminal.

Now, the second embodiment of a node device and a network resource reservation method according to the present invention will be described in further detail.

The data packet communication network of this second embodiment has the substantially similar configuration as that of FIG. 1 described above for the first embodiment.

In addition, the data packet communication node of this second embodiment is assumed to be provide in advance with an information regarding an amount of resource at the IP level that can be used at a time of data packet transfer with respect to the adjacent data packet communication node.

In a case where various types of services for the IP data packets as described above are provided on the data packet communication network of FIG. 1, the correspondence between the IP packets and the ATM cells are made as shown in FIG. 16 or FIG. 17.

In an example shown in FIG. 16, one virtual connection is set in correspondence to one packet flow for the Guaranteed Quality of Service, and in order to reserve an amount of resource Rgm at the IP packet level which is necessary for satisfying the transmission rate value requested by the Guaranteed Quality of Service flow gm ($1 \leq m \leq n$), an amount of bandwidth PCRgm is reserved in an ABT connection VCgm for accommodating this flow. For the Predictive Quality of Service and the Best-Effort Service, all the flows requesting these services are accommodated on one virtual connection, and an amount of bandwidth PCRr is reserved in an ABT connection VCr for accommodating these flows in order to reserve a total sum of amounts of resources R1 to R3 at the IP packet level which are to be allocated to three service levels of the Predictive Quality of Service and an amount of resource Rb at the IP packet level which is to be allocated to the Best-Effort Service.

In an example shown in FIG. 17, all the Guaranteed Quality of Service flows are accommodated on one virtual connection, and in order to reserve a total amount of resources (ERgm) at the IP packet level which are to be allocated to the Guaranteed Quality of Service flows, an amount of bandwidth PCRg is reserved in an ABT connection VCg for accommodating these flows. The Predictive Quality of Service and the Best-Effort Service are handled similarly as in FIG. 16.

The amounts of resources R1 to R3 at the IP packet level which are to be allocated to three service levels of the Predictive Quality of Service are calculated and allocated such that a relationship of delay value sizes at different service levels correctly holds (so that the delay value becomes smaller for the smaller level value) and an upper limit for the required transfer time which is set up for each level can be satisfied. In addition, for the amount of resource Rb at the IP packet level which is to be allocated to the Best-Effort Service, an arbitrary amount of resource within a range of not exceeding the residual amount of resource is allocated, where the residual amount of resource is obtained by subtracting amounts of resources Rg1 to Rgn allocated to the Guaranteed Quality of Service and amounts of resources R1 to R3 allocated to the Predictive Quality of Service from the total amount of resources allocated to the data packet communication node.

In the following description, unless otherwise stated, it is assumed that the correspondence between the IP packets and the ATM cells are made as shown in FIG. 16.

Note that, as described above, the ABT service includes the ABT/DT service in which the data cell transfer is started after receiving the returned RM cell and the ABT/IT service in which the data cell transfer is started without waiting for the returned RM cell, and in this second embodiment, a use of the ABT/IT service which starts the data cell transfer immediately is assumed.

FIG. 18 shows an exemplary configuration of a resource management unit for providing one function of the data packet communication node of this second embodiment accounting for the characteristic of the ABT connection. As shown in FIG. 18, this resource management unit comprises an IP packet flow management unit 61, an IP level resource management unit 62, an IP packet flow information management unit 63, an ABT connection establishing unit 64, an ABT reserved resource changing unit 65, and an ABT connection information management unit 66.

The IP packet flow management unit 61 receives a new service request or a quality of service change request regarding the IP packet, and commands an appropriate operation.

The IP level resource management unit 62 manages and controls the resource information regarding the IP packet flows which are currently served by this data packet communication node.

The IP packet flow information management unit 63 stores an information regarding amounts of resources allocated to the IP packet flows which are currently served by this data packet communication node.

The ABT connection establishing unit 64 establishes an ABT connection on the ATM network when an establishing of a virtual connection is newly required.

The ABT reserved resource changing unit 65 changes an amount of bandwidth to be reserved in the ABT connection which is already established.

The ABT connection information management unit 66 stores an information regarding the ABT connections which are currently established.

In this resource management unit of FIG. 18, for a new service request (such as a new IP packet flow transfer request or a service type change request) or a quality of service change request recognized at the data packet communication node accommodating this resource management unit, whether it is possible to accept that request or not is judged according to the IP packet flow information and the ABT connection information managed by this resource management unit.

The IP packet flow information management unit 63 manages information regarding identifiers of flows providing the Guaranteed Quality of Service and amounts of resources allocated to these flows, amounts of resources allocated to flows for providing three service levels of the Predictive Quality of Service, an amount of resource allocated to all the flows requesting the Best-Effort Service, and a residual bandwidth which is not yet allocated to any flow and can be allocated to a new flow in this data packet communication node. Here, for the identifier of the IP packet flow, when the packet is in a format according to the Internet Protocol Version 6 (IPv6), a set of a flow label value and a source address value given in the header portion of the packet is used.

The ABT connection information management unit 66 manages an identifier of each connection and an amount of bandwidth reserved in that connection in correspondence. Here, for the identifier of the ABT connection, a virtual path identifier (VPI) or a virtual channel identifier (VCI) is used.

Note that it is preferable for the information managed by the IP packet flow information management unit 63 and the information managed by the ABT connection information management unit 66 to have structures in which the amount of resource at the IP level and the information regarding the ABT connection for accommodating the packets to which that amount of resource is to be allocated are set in correspondence.

FIG. 19 shows a flow chart of the operation algorithm for the resource management unit of FIG. 18 which is one function of the data packet communication node of this second embodiment.

When a new service request or a quality of service change request is received at the data packet communication node (step S71), first, the IP packet flow management unit 61 of the resource management unit judges whether the received request is a new request for the Guaranteed Quality of Service which is not registered in the IP packet flow information management unit 63 or not (step S72). When the received request is a new request for the Guaranteed Quality of Service, the ABT connection establshing unit 64 newly establishes an ABT connection for accommodating this flow (step S73). Note that, the ABT connection is also newly established in a case where the flow which is already providing the service other than the Guaranteed Quality of Service requests the change to the Guaranteed Quality of Service.

Next, whether it is possible to allocate a sufficient amount of resource for providing the requested quality of service or not is judged according to the information in the IP packet flow information management unit 63 (step S74). At this point, when this flow is requesting the Guaranteed Quality of Service, the IP level resource management unit 62 makes the judgement according to whether a sufficient amount of resource (or a difference from the currently allocated amount of resource when this flow is already served by the Guaranteed Quality of Service) for satisfying the transmission rate value requested by this flow can be provided by a sum of the amount of residual resource Rest and the amount of resource Rb allocated to the Best-Effort Service or not.

Note that, when this flow is requesting a change to the service of a slower rate than the transmission rate value of the service already served for this flow, the requested quality of service can be provided for sure. Also, when this flow is requesting the Predictive Quality of Service, the judgement is made according to whether an increase in the amount of resource necessary for correctly holding a relationship of delay value sizes at different service levels and satisfying an upper limit for the required transfer time for the service level requested by this flow can be provided by a sum of the amount of residual resource Rest and the amount of resource Rb allocated to the Best-Effort Service even when this flow is accepted.

When the IP level resource management unit 62 judges that it is possible to reserve a sufficient amount of resource for satisfying the requested quality of service, in order to carry out the change of the reserved amount of bandwidth in the ABT connection for accommodating this flow, the RM cell describing the reserved amount of bandwidth after the change is transmitted to that ABT connection by the ABT reserved resource changing unit 65 (step S75), and then the data cell transfer at the requested quality of service is started (step S76). In other words, the ABT connection provides the ABT/IT service. At this point, a time since the RM cell is transmitted until the data cell transmission starts is set up by the ABT reserved resource changing unit 65 according to the attributes of the ATM network to which the cells are to be transferred.

On the other hand, when the IP level resource management unit 62 judges that it is impossible to reserve the sufficient amount of resource, the received request is rejected (step S77). Note that, in a case of reducing the amount of resource allocated to the Best-Effort Service in order to reserve the amount of resource after the change, the RM cell describing the amount of bandwidth after reduction is transmitted to the ABT connection accommodating the Best-Effort Service first, and then the RM cell describing the reserved amount of bandwidth after the change is transmitted to the ABT connection for accommodating the flow which made the change request.

When the RM cell transmitted at the step S75 before the data cell transmission at the step S76 is returned through the ATM network and received at this data packet communication node (step S78), whether the amount of bandwidth described in that RM cell was reserved in the ABT connection or not judged by checking the CI bit of this RM cell (step S79). If the CI bit is 0, it implies that the reserving of the requested amount of bandwidth was carried out, so that the data cell transfer is continued (step S80), whereas if the CI bit is 1, it implies that the reserving of the requested amount of bandwidth was not carried out, so that the requested change of the quality of service is interrupted and the request is rejected (step S81).

Note that, after the data packet transmission according to the newly requested quality of service is started at the step S76, if the necessary amount of resource could not be reserved, the data packet transmission according to the newly requested quality of service can be interrupted and the data packet transmission according to the originally requested quality of service can be resumed.

In this case, if the provided service is such a service that the amount of resource in the ABT connection is set to zero when the quality of service change request is rejected because the resource cannot be reserved in that ABT connection, it is necessary for the data packet communication node to re-transmit the RM cell in order to recover the amount of resource before the request, but if the provided service is such a service that the amount of resource before the request is recovered automatically, there is no need to re-transmit the RM cell.

Alternatively, after the data packet transmission according to the newly requested quality of service is started at the step S76, if the necessary amount of resource could not be reserved, the data packet transmission according to the newly requested quality of service can be interrupted and the data packet transmission can be resumed without guaranteeing any quality at all.

Figure 20:
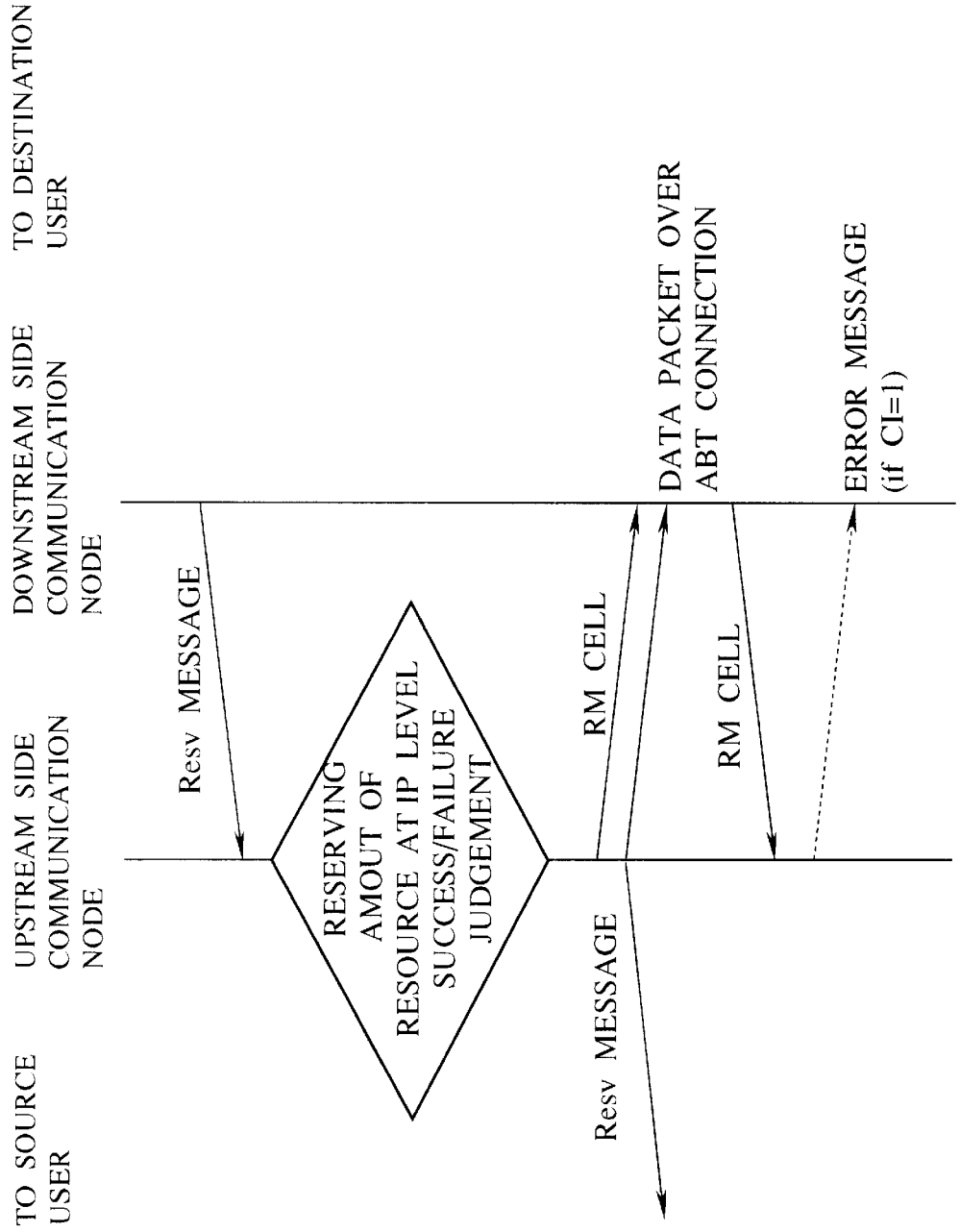
FIG. 20 is a sequence diagram for explaining a network resource reservation procedure according to the second embodiment of the present invention.

Next, FIG. 20 shows a procedure for the network resource reservation to be carried out according to the Resv message and the data packet transfer to be carried out without waiting for the confirmation of the reserving of the necessary amount of resource in a case where the virtual connection connecting between the data packet communication nodes provides the ABT/IT service.

This procedure is carried out by the data packet communication node 121 which is directly connected with the source terminal 111 and the data packet communication node 122 which is located between the data packet communication nodes, for example.

In FIG. 20, when the data packet communication node which received the Resv message from the downstream side judges that it is possible to reserve the necessary amount of resource as described above, the RM cell indicating the resource reservation request for the ABT connection establishing between this data packet communication node and the downstream side data packet communication node which transmitted the Resv message is transmitted to the downstream side data packet communication node, while the received Resv message is transmitted to the data packet source side user terminal, and the data packet transmission according to the newly requested quality of service is started immediately.

Then, when the RM cell with CI=0 is received by the data packet communication node which transmitted the RM cell, it is recognized that the reservation of the requested amount of resource was carried out in that connection, and the data packet transmission according to the newly requested quality of service is continued.

On the other hand, when the RM cell with CI=1 is received by the data packet communication node which transmitted the RM cell, the error message is transmitted to the data packet destination side user terminal which transmitted the Resv message.

When the network resource reservation and the data packet transfer are carried out according to the above procedure between the data packet communication nodes joining the source terminal and the destination terminal, and the resource reservation requests are successful in all the ABT connections, it becomes possible to quickly provide the data packet transfer according to the newly requested quality of service.

If the necessary resource could not be reserved in some ABT connection, the error message is given to the destination terminal so that the destination terminal carries out the error processing according to the need.

Note that the second embodiment described above is directed to a case in which the quality of service for the IP data packet sent from the source terminal is requested to the data packet communication network by the destination terminal, and the reservation of the resource for satisfying that request is carried out at the data packet communication network. However, instead of that, it is also possible to carry out the resource reservation in response to a message (such as a CONNECT message or a CHANGE message of the ST-II (Stream Protocol Version 2), for example) sent from the source terminal to the destination terminal.

As described, according to this second embodiment of the present invention, at a time of delivering the data packet through the ATM network, whether it is possible to reserve the necessary amount of resource which is obtained according to the requested quality of service described in the message sent from the source/destination user terminal to the destination/source user terminal, and the data packet transmission according to the newly requested quality of service is started immediately when it is judged possible to reserve the necessary amount of resource, so that it is possible to resolve the delay caused by waiting for a notice regarding the quality of service change request accept/reject judgement which is to be notified from the ATM network, and consequently, it becomes possible to provide a fast data packet transfer service.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A node device, comprising:
   a transfer unit configured to receive cells defining data packets and messages, convert each data packet defined in received cells into ATM cells, and transmit converted ATM cells to virtual connections; and
   a request unit configured to request a change of a virtual connection for transferring data packets from one virtual connection to a prescribed virtual connection for providing a service which is capable of changing an amount of resource without reestablishing connections, when a prescribed message of a resource reservation protocol for said one virtual connection is received by the transfer unit.

2. The node device of claim 1, wherein the prescribed virtual connection is either an ABT (ATM Block Transfer) connection or a virtual connection having a function to change a connection characteristic according to a signaling message.

3. The node device of claim 1, wherein the prescribed message is either an Resv (reservation request) message or a Path message of an RSVP (Resource ReSerVation Protocol).

4. The node device of claim 1, wherein the amount of resource that can be changed in the service provided by the prescribed virtual connection is either an amount of bandwidth in the prescribed virtual connection or a cell transmission rate of a cell transfer through the prescribed virtual connection.

5. The node device of claim 1, wherein said one virtual connection is a virtual connection which does not guarantee any quality for a cell transfer which is already established before the prescribed message is received by the transfer unit.

6. The node device of claim 1, further comprising:
   a changing unit configured to change a maximum cell transmission rate of the prescribed virtual connection when a particular message of the resource reservation protocol sent from a data packet source user terminal to a data packet destination user terminal is received by the transfer unit.

7. The node device of claim 6, wherein the particular message is a Path message of an RSVP (Resource ReSerVation Protocol).

8. The node device of claim 1, further comprising:
   a judgement unit configured to judge whether a necessary amount of resource determined according to a requested quality of service described in a reservation message can be reserved in the prescribed virtual connection or not when the reservation message of the resource reservation protocol is received by the transfer unit;
   wherein the transfer unit starts a transmission of the data packets according to the requested quality of service without waiting for a receiving or a resource management cell indicating that the necessary amount of resource is reserved in the prescribed virtual connection when the judgement unit judges that the necessary amount of resource can be reserved.

9. The node device of claim 8, wherein the reservation message is an Resv (reservation request) message of an RSVP (Resource ReSerVation Protocol).

10. The node device of claim 8, wherein the resource management cell indicates whether the necessary amount of resource is reserved in the prescribed virtual connection or not by a CI (Congestion Indication) bit value.

11. The node device of claim 8, wherein the prescribed virtual connection is a virtual connection for providing an ABT/IT (ATM Block Transfer/Immediate Transmission) service.

12. The node device of claim 8, wherein the necessary amount of resource is determined as an amount of resource necessary in providing a quality of service satisfying the requested quality of service for the data packets to be transferred from a data packet source user terminal to a data packet destination user terminal.

13. The node device of claim 8, wherein the transfer unit starts the transmission of the data packets according to the requested quality of service after transmitting a resource management cell describing a desired amount of resource to be reserved in order to reserve the necessary amount of resource in the prescribed virtual connection.

14. The node device of claim 13, wherein the transfer unit interrupts the transmission of the data packets according to the requested quality of service and resumes the transmission of the data packets according to an original quality of service, when a resource management cell indicating that the necessary amount of resource is not reserved in the prescribed virtual connection is received after the transmission of the data packets according to the requested quality of service is started.

15. The node device of claim 13, wherein the transfer unit interrupts the transmission of the data packets according to the requested quality of service and resumes the transmission of the data packets without guaranteeing any quality, when a resource management cell indicating that the necessary amount of resource is not reserved in the prescribed virtual connection is received after the transmission of the data packets according to the requested quality of service is started.

16. A node device, comprising:
   a transfer unit configured to receive cells defining data packets and messages, convert each data packet defined in received cells into ATM cells, and transmit converted ATM cells;
   a determining unit configured to determine a necessary amount of resource according to a requested quality of service described in a reservation message, when the reservation message of a resource reservation protocol sent from a data packet destination user terminal to a data packet source user terminal is received by the transfer unit; and
   a request unit configured to request a change of an amount of resource reserved in a virtual connection for transferring data packets in order to reserve the necessary amount of resource determined by the determining unit in said virtual connection.

17. The node device of claim 16, wherein the reservation message is an Resv (reservation request) message of an RSVP (Resource ReSerVation Protocol).

18. The node device of claim 16, wherein the necessary amount of resource determined by the determining unit is an amount of resource necessary in providing a quality of service satisfying the requested quality of service for the data packets to be transferred from the data packet source user terminal to the data packet destination user terminal.

19. The node device of claim 16, wherein the transfer unit transmits the reservation message to the data packet source user terminal when the necessary amount of resource is reserved in said virtual connection.

20. The node device of claim 16, wherein the request unit requests the change of the amount of resource by transmitting a resource management cell describing a desired amount of resource to be reserved.

21. The node device of claim 16, wherein the request unit judges whether the necessary amount of resource is reserved in said virtual connection or not according to a resource management cell received by the transfer unit.

22. The node device of claim 21, wherein the resource management cell indicates whether the necessary amount of resource is reserved in said virtual connection or not by a CI (Congestion Indication) bit value.

23. The node device of claim 16, wherein said virtual connection is a prescribed virtual connection for providing a service which is capable of changing an amount of resource without reestablishing connections, which is established in advance.

24. The node device of claim 16, further comprising:
   a connection change request unit configured to request a change of said virtual connection from one virtual connection to a prescribed virtual connection for providing a service which is capable of changing an amount of resource without reestablishing connections, when a prescribed message of the resource reservation protocol for said virtual connection is received by the transfer unit.

25. The node device of claim 24, wherein the prescribed virtual connection is either an ABT (ATM Block Transfer) connection or a virtual connection having a function to change a connection characteristic according to a signaling message.

26. The node device of claim 24, wherein the prescribed message is either an Resv (reservation request) message or a Path message of an RSVP (Resource ReSerVation Protocol).

27. The node device of claim 24, wherein the amount of resource that can be changed in the service provided by the prescribed virtual connection is either an amount of bandwidth in the prescribed virtual connection or a cell transmission rate of a cell transfer through the prescribed virtual connection.

28. The node device of claim 24, wherein said one virtual connection is a virtual connection which does not guarantee any quality for a cell transfer which is already established before the prescribed message is received by the transfer unit.

29. The node device of claim 24, further comprising:
   a changing unit configured to change a maximum cell transmission rate of the prescribed virtual connection when a particular message of the resource reservation protocol sent from a data packet source user terminal to a data packet destination user terminal is received by the transfer unit.

30. The node device of claim 29, wherein the particular message is a Path message of an RSVP (Resource ReSerVation Protocol).

31. The node device of claim 16, further comprising:
   a judgement unit configured to judge whether a necessary amount of resource determined according to a requested quality of service described in a reservation message can be reserved in said virtual connection or not when the reservation message is received by the transfer unit;
   wherein the transfer unit starts a transmission of the data packets according to the requested quality of service without waiting for a receiving of a resource management cell indicating that the necessary amount of resource is reserved in said virtual connection when the judgement unit judges that the necessary amount of resource can be reserved.

32. The node device of claim 31, wherein the resource management cell indicates whether the necessary amount of resource is reserved in said virtual connection or not by a CI (Congestion Indication) bit value.

33. The node device of claim 31, wherein said virtual connection is a prescribed virtual connection for providing a service which is capable of changing an amount of resource without reestablishing connections.

34. The node device of claim 33, wherein the prescribed virtual connection is a virtual connection for providing an ABT/IT (ATM Block Transfer/Immediate Transmission) service.

35. The node device of claim 31, wherein the transfer unit starts the transmission of the data packets according to the requested quality of service after transmitting a resource management cell describing a desired amount of resource to be reserved in order to reserve the necessary amount of resource in said virtual connection.

36. The node device of claim 35, wherein the transfer unit interrupts the transmission of the data packets according to the requested quality of service and resumes the transmission of the data packets according to an original quality of service, when a resource management cell indicating that the necessary amount of resource is not reserved in said virtual connection is received after the transmission of the data packets according to the requested quality of service is started.

37. The node device of claim 35, wherein the transfer unit interrupts the transmission of the data packets according to the requested quality of service and resumes the transmission of the data packets without guaranteeing any quality, when a resource management cell indicating that the necessary amount of resource is not reserved in said virtual connection is received after the transmission of the data packets according to the requested quality of service is started.

38. A network resource reservation method in a node device for receiving cells defining data packets and messages, converting each data packet defined in received cells into ATM cells, and transmitting converted ATM cells to virtual connections, the method comprising the steps of:

requesting a change of a virtual connection for transferring data packets from one virtual connection to a prescribed virtual connection for providing a service which is capable of changing an amount of resource without reestablishing connections, when a prescribed message of a resource reservation protocol for said one virtual connection is received by the node device; and transmitting the data packets to the prescribed virtual connection established in response to the requesting step.

39. The method of claim 38, further comprising the steps of:

judging whether a necessary amount of resource determined according to a requested quality of service described in a reservation message can be reserved in the prescribed virtual connection or not when the reservation message of a resource reservation protocol is received by the node device;

wherein the transmitting step starts a transmission of the data packets according to the requested quality of service without waiting for a receiving of a resource management cell indicating that the necessary amount of resource is reserved in the prescribed virtual connection when the judging step judges that the necessary amount of resource can be reserved.

40. A network resource reservation method in a node device for receiving cells defining data packets and messages, converting each data packet defined in received cells into ATM cells, and transmitting converted ATM cells to virtual connections, the method comprising the steps of:

determining a necessary amount of resource according to a requested quality of service described in a reservation message, when the reservation message of a resource reservation protocol sent from a data packet destination user terminal to a data packet source user terminal is received by the node device;

requesting a change of an amount of resource reserved in a virtual connection for transferring data packets in order to reserve the necessary amount of resource determined by the determining step in said virtual connection; and transmitting the data packets to said virtual connection in which the amount of resource reserved therein is changed in response to the requesting step.

41. The method of claim 40, further comprising the steps of:

judging whether the necessary amount of resource can be reserved in said virtual connection or not when the reservation message is received by the node device;

wherein the transmitting step starts a transmission of the data packets according to the requested quality of service without waiting for a receiving of a resource management cell indicating that the necessary amount of resource is reserved in said virtual connection when the judging step judges that the necessary amount of resource can be reserved.

* * * * *